(12) United States Patent
Pecjak et al.

(10) Patent No.: US 11,038,970 B2
(45) Date of Patent: *Jun. 15, 2021

(54) COMBINING MEASUREMENTS BASED ON BEACON DATA

(71) Applicant: comScore, Inc., Reston, VA (US)

(72) Inventors: Frank Eugene Pecjak, Fairfax, VA (US); Brian Pugh, Reston, VA (US); Ramzi Joseph Nasr, Falls Church, VA (US); Balakrishnan Vinayak Nair, Herndon, VA (US); Kris Johnson, Washington, DC (US)

(73) Assignee: Comscore, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,191

(22) Filed: Nov. 26, 2019

(65) Prior Publication Data

US 2020/0097986 A1 Mar. 26, 2020

Related U.S. Application Data

(63) Continuation of application No. 15/972,179, filed on May 6, 2018, now Pat. No. 10,489,801, which is a
(Continued)

(51) Int. Cl.
*H04L 29/08* (2006.01)
*H04W 72/12* (2009.01)
(Continued)

(52) U.S. Cl.
CPC ....... *H04L 67/146* (2013.01); *G06Q 30/0201* (2013.01); *H04L 67/02* (2013.01); *H04L 67/42* (2013.01); *H04W 72/1257* (2013.01)

(58) Field of Classification Search
CPC ....... H04L 67/02; H04L 67/42; H04L 67/146; G06Q 10/06; G06Q 30/0201; H04W 72/1257
See application file for complete search history.

(56) References Cited

U.S. PATENT DOCUMENTS 7,260,837 B2 8/2007 Abraham et al.
7,606,897 B2 10/2009 Izrailevsky et al.
(Continued)

*Primary Examiner* — Azizul Choudhury
(74) *Attorney, Agent, or Firm* — BakerHostetler

(57) ABSTRACT

Mobile usage data representing the access of one or more resources on a network by mobile devices is accessed. The mobile usage data includes information received from mobile devices as a result of beacon instructions included with the one or more resources. A first set of data representing information about accesses to the one or more resources by mobile devices with persistent beacon cookies is determined. A second set of data representing information about accesses to the one or more resources by mobile devices with non-persistent beacon cookies is determined. One or more adjustment factors are determined based on the first set of data. A count of unique visitors accessing the one or more resources from the mobile devices is determined based on a count of accesses by the mobile devices with persistent beacon cookies and a count of accesses by the mobile devices with non-persistent beacon cookies adjusted by the one or more adjustment factors.

20 Claims, 15 Drawing Sheets

Related U.S. Application Data continuation of application No. 15/249,817, filed on Aug. 29, 2016, now Pat. No. 10,032,179, which is a continuation of application No. 13/481,474, filed on May 25, 2012, now Pat. No. 9,430,746.

(60) Provisional application No. 61/489,860, filed on May 25, 2011.

(51) Int. Cl.
*G06Q 30/02* (2012.01)
*H04L 29/06* (2006.01)

(56) References Cited

U.S. PATENT DOCUMENTS

| | | | |
|---|---|---|---|
| 8,688,681 B1 | 4/2014 | Xiao et al. | |
| 9,430,746 B2 * | 8/2016 | Pecjak | G06Q 10/06 |
| 10,032,179 B2 * | 7/2018 | Pecjak | H04L 67/02 |
| 10,489,801 B2 * | 11/2019 | Pecjak | H04L 67/42 |
| 2003/0046159 A1 | 3/2003 | Ebrahimi et al. | |
| 2004/0019518 A1 | 1/2004 | Abraham et al. | |
| 2006/0262792 A1 | 11/2006 | Rokui | |
| 2008/0214154 A1 | 9/2008 | Ramer et al. | |
| 2008/0249905 A1 | 10/2008 | Wong et al. | |
| 2008/0250136 A1 | 10/2008 | Izrailevsky et al. | |
| 2010/0312702 A1 | 12/2010 | Bullock | |
| 2011/0004682 A1 | 1/2011 | Honnold et al. | |
| 2011/0246641 A1 | 10/2011 | Pugh et al. | |
| 2012/0324101 A1 | 12/2012 | Pecjack et al. | |
| 2013/0205020 A1 * | 8/2013 | Broda | H04L 43/08 709/224 |
| 2013/0282923 A1 | 10/2013 | Taylor et al. | |

* cited by examiner

COMBINING MEASUREMENTS BASED ON BEACON DATA

CROSS-REFERENCE TO RELATED APPLICATION

This application is a continuation of U.S. Pat. Ser. No. 15/972,179, filed May 6, 2018, which will issue as U.S. Pat. No. 10,489,801 on Nov. 26, 2019, which is a continuation of U.S. Pat. Ser. No. 15/249,817, filed Aug. 29, 2016, and issued as U.S. Pat. No. 10,032,179 on Jul. 24, 2018, which is a continuation of U.S. Pat. Ser. No. 13/481,474, filed May 25, 2012, and issued as U.S. Pat. No. 9,430,746 on Aug. 30, 2016, which claims the benefit of U.S. Provisional Patent Application No. 61/489,860, filed May 25, 2011, the contents of which are all incorporated herein in their entirety.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In one aspect, usage data representing the access of a set of resources on a network is accessed. The usage data is based at least in part on information received from client systems sent as a result of beacon instructions included with the set of resources. A first set of usage data representing access by client systems classified as a first type is determined based on the accessed usage data. A count of unique visitors accessing the network resources from the first type of client systems based on the first set of usage data is determined. A second set of usage data representing access by client systems classified as a second type is determined based on the accessed usage data. A count of unique visitors accessing the network resources from the second type of client systems is determined based on the second set of usage data. A total count of unique visitors accessing the network resources from the first and second types of client systems is determined based on data representing the usage overlap of devices of the first type with devices of the second type.

Implementations may include one or more of the following features. The first type of client system may be a non-mobile, non-shared use personal computing device type. The second type of client system may be a mobile computing device type. A third set of usage data representing access by client systems classified as a third type may be determined based on the accessed usage data. A count of unique visitors accessing the network resources from the third type of client systems may be determined based on the third set of usage data. Determining the total count of unique visitors accessing the network resources may include determining a total count of unique visitors accessing the network resources from the first, second, and third types of client systems based on data representing the usage overlap of devices of the first, second, and third types. The third type of client system may be a shared use computing device type. The second type of client system may be a shared use computing device type.

A first subset of data representing information about accesses to the resources by mobile devices with persistent beacon cookies may be determined based on the second set of usage data, wherein the persistent beacon cookies were present for a duration that meets a persistence threshold. A second subset of data representing information about accesses to the resources by mobile devices with non-persistent beacon cookie may be determined based on the second set of usage data, wherein the non-persistent beacon cookies were present for a duration that does not meet the persistence threshold. One or more adjustment factors may be determined based on the first subset of data. A count of unique visitors accessing the set of resources from mobile devices may be determined based, at least in part, on a count of accesses by mobile devices with persistent cookies and a count of accesses by mobile devices with non-persistent beacon cookies adjusted by the adjustment factors.

A subset of shared use data representing access of the network resources by shared use devices sharing a common location may be determined based on the second set of usage data. A number of shared use devices and a number of persons at the common location may be estimated based on the subset of shared use data. A count of unique visitors to the network resources from shared use devices at the common location may be determined based on the estimated number of shared use devices and number of persons at the common location.

Sample data representing the access of the network resources may be accessed. The sample data may include information about the overlap in use of client systems classified as the first type and client systems classified as the second type. An overlap factor may be generated based on the accessed sample data. The overlap factor may represent the usage overlap of devices of the first type with devices of the second type. Determining the total count may include determining the total count of unique visitors accessing the network resources based on the generated overlap factor. The sample data may represent survey data for users accessing one or more of the network resources. The survey data may classify each user's current client system used to access one or more of the network resources and may further classify one or more other client systems regularly used by the user. The sample data may be panel data.

In one aspect, mobile usage data representing the access of one or more resources on a network by client devices classified as mobile devices is accessed. The mobile usage data includes information received from client devices sent as a result of beacon instructions included with the set of resources. A first set of data representing information about accesses to the resources by mobile devices with persistent beacon cookies, wherein the persistent beacon cookies were present for a duration that meets a persistence threshold, is determined based on the accessed mobile usage data. A second set of data representing information about accesses to the resources by mobile devices with non-persistent beacon cookies, wherein the non-persistent beacon cookies were present for a duration that does not meet the persistence threshold, is determined based on the accessed mobile usage data. One or more adjustment factors is determined based on the first set of data. A count of unique visitors accessing the set of resources from mobile devices is determined based, at least in part, on a count of accesses by mobile devices with persistent beacon cookies and a count of accesses by mobile devices with non-persistent beacon cookies adjusted by the adjustment factors.

Implementations may include one or more of the following features. An average access count per cookie may be determined based on the first set of data. For each non-persistent cookie, a unique view factor may be determined based on a function of the duration of the cookie and a ratio of the access count for the cookie to the average access count. A third set of data representing information about accesses to the resources by mobile devices without beacon cookies may be determined based on the received mobile usage data. Determining the total count of unique visitors accessing the set of resources from mobile devices may include determining the total count of unique visitors accessing the set of resources from mobile devices based, at least in part, on the count of accesses by mobile devices with persistent cookies, the count of accesses by mobile devices with non-persistent beacon cookies adjusted by the adjustment factors, and a count of accesses by mobile devices without beacon cookies adjusted by the adjustment factors.

A first subset of data representing information about accesses to the resources by mobile devices with persistent beacon cookies that are classified as a first mobile platform may be determined. A second subset of data representing information about accesses to the resources by mobile devices with persistent beacon cookies that are classified as a second mobile platform may be determined. Adjustment factors for mobile devices classified as the first platform may be determined based at least in part on the first subset of data. Adjustment factors for mobile devices classified as the second platform may be determined based at least in part on the second subset of data.

A count of mobile devices classified as a first mobile platform may be determined determining based, at least in part, on a count of mobile devices with persistent cookies and classified as the first mobile platform and a count of mobile devices with non-persistent beacon cookies adjusted by the adjustment factors and classified as the first mobile platform. A count of mobile devices classified as a second mobile platform may be determined based, at least in part, on a count of mobile devices with persistent cookies and classified as the second mobile platform and a count of mobile devices with non-persistent beacon cookies adjusted by the adjustment factors and classified as the second mobile platform. Determining the one or more adjustment factors may include determining the proportion of mobile devices with persistent cookies that accessed the one or more resources a particular number of times.

In one aspect, mobile usage data representing the access of a set of resources on a network by client devices classified as mobile devices is accessed. The mobile usage data includes information received from client systems sent as a result of beacon instructions included with the set of resources. A set of cookie usage data representing access by mobile devices with beacon cookies associated with the beacon instructions is identified. A set of non-cookie usage data representing access by mobile devices without the beacon cookies is identified. A cookie count of unique visitors based on the cookie usage data is determined. A non-cookie count of unique visitors based on the non-cookie usage data and the cookie usage data is determined. The cookie count and the non-cookie count are aggregated to determine a total count of unique visitors for mobile devices.

Implementations may include one or more of the following features. Prior to identifying the cookie usage data and the non-cookie usage data, the mobile usage data may be pre-processed to exclude usage data based on the use of non-browser mobile applications. A set of persistent cookie usage data representing usage data for cookies having a usage duration that meets a persistence threshold may be identified. A set of non-persistent cookie usage data representing usage data for cookies having a usage duration that does not meet the persistence threshold may be identified. A persistent cookie count of unique visitors may be determined based on the persistent cookie usage data. A non-persistent cookie count of unique visitors may be determined based on the non-persistent cookie usage data, the persistent cookie-usage data, and the usage duration of each non-persistent cookie. The persistent cookie count and the non-persistent cookie count may be aggregated to determine the cookie count of unique visitors. The non-cookie count of unique visitors may be determined based on the persistent cookie usage data.

In one aspect, usage data representing the access of a set of resources on a network by client devices is accessed. The usage data includes information received from client systems sent as a result of beacon instructions included with the set of resources. A set of shared use data representing access of the network resources by client devices classified as shared use devices is determined based on the accessed usage data. A first set of shared use data representing access of the network resources by shared use devices sharing a first common location is determined based on the set of shared use data. A second set of shared use data representing access of the network resources by shared use devices sharing a second common location is determined based on the set of shared use data. A number of shared use devices and a number of persons at the first common location are estimated based on the first set of shared use data. A first count of unique visitors to the network resources from shared use devices at the first common location is determined based on the estimated number of shared use devices and number of persons at the first common location. A number of shared use devices and a number of persons at the second common location are estimated based on the second set of shared use data. A second count of unique visitors to the network resources from shared use devices at the second common location is determined based on the estimated number of shared use devices and number of persons at the second common location. A count of unique visitors accessing the network resources by shared use devices is determined based, at least in part, on the aggregation of the first and second counts.

Implementations may include one or more of the following features. The usage data may be grouped into one or more groups according to IP addresses associated with the data. Each group of usage data may represent the data associated with IP addresses within a defined address block. For each group of usage data, a probability that the usage data within that group corresponds to one or more shared use devices may be generated. One or more of the groups may be identified as the set of shared usage data based on the generated probabilities. An enumerated percentage representing an estimate of the amount of the usage data that is attributable to shared use devices may be received. The group having the highest probability of the generated probabilities may be selected. The group having the highest probability among the generated groups may continue to be selected until the total usage of the selected groups represents a proportion of the total usage data that satisfies the enumerated percentage.

The first set of shared usage data may be grouped into windows of time according to time stamps associated with the data. The number of shared use devices may be estimated by identifying the maximum number of cookies in use during the same window of time. The number of persons may be estimated by aggregating the number of cookies in use during each window of time over all the windows of time. A number of shared use devices and a number of persons may be estimated for the first common location over a first period of time. A number of shared use devices and a number of persons may be estimated for the first common location over a second period of time. Determining the first count of unique visitors to the network resources from shared use devices at the first common location may include a first count of unique visitors to the network resources from shared use devices at the first common location based on the number of shared use devices and number of persons estimated during both the first period of time and the second period of time.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In general, webpage or other resource accesses by client systems may be recorded, and those accesses may be analyzed to develop audience measurement reports. Data about resource accesses can be collected using a beacon-based approach. A beacon-based approach generally involves associating script or other code with the resource being accessed such that the code is executed when a client system renders or otherwise employs the resource. When executed, the beacon code sends a message from the client system to a collection server. The message includes certain information, such as an identifier of the resource accessed.

The beacon code may be accessed and processed by a number of different types of client systems, such as personal computers, mobile devices, and shared use devices (for example, computers at libraries or interne cafés). However, each type of device may present somewhat different challenges when translating the measured activity from a machine-basis to a person-basis. For instance, a beacon-based approach may employ cookies or IP addresses to help uniquely identify the activity of a particular machine. However, there may be difficulties in translating such activity to unique persons because cookies may be deleted or IP addresses may be dynamically assigned. Such issues are more or less prevalent depending on the type of device. Accordingly, the following describes various techniques for accounting for these types of difficulties on various types of client systems when determining audience measurements such as unique views or reach.

Furthermore, a given user may use more than one type of device. Yet for certain types of audience measurements, such as unique views or reach, that person should be counted once, rather than multiple times. Because he or she is using a different device, however, it may be difficult to understand that the same person is using both types of devices. Accordingly, the following describes various techniques for accounting for such overlap when combining audience measurements across different device types.

Figure 1:
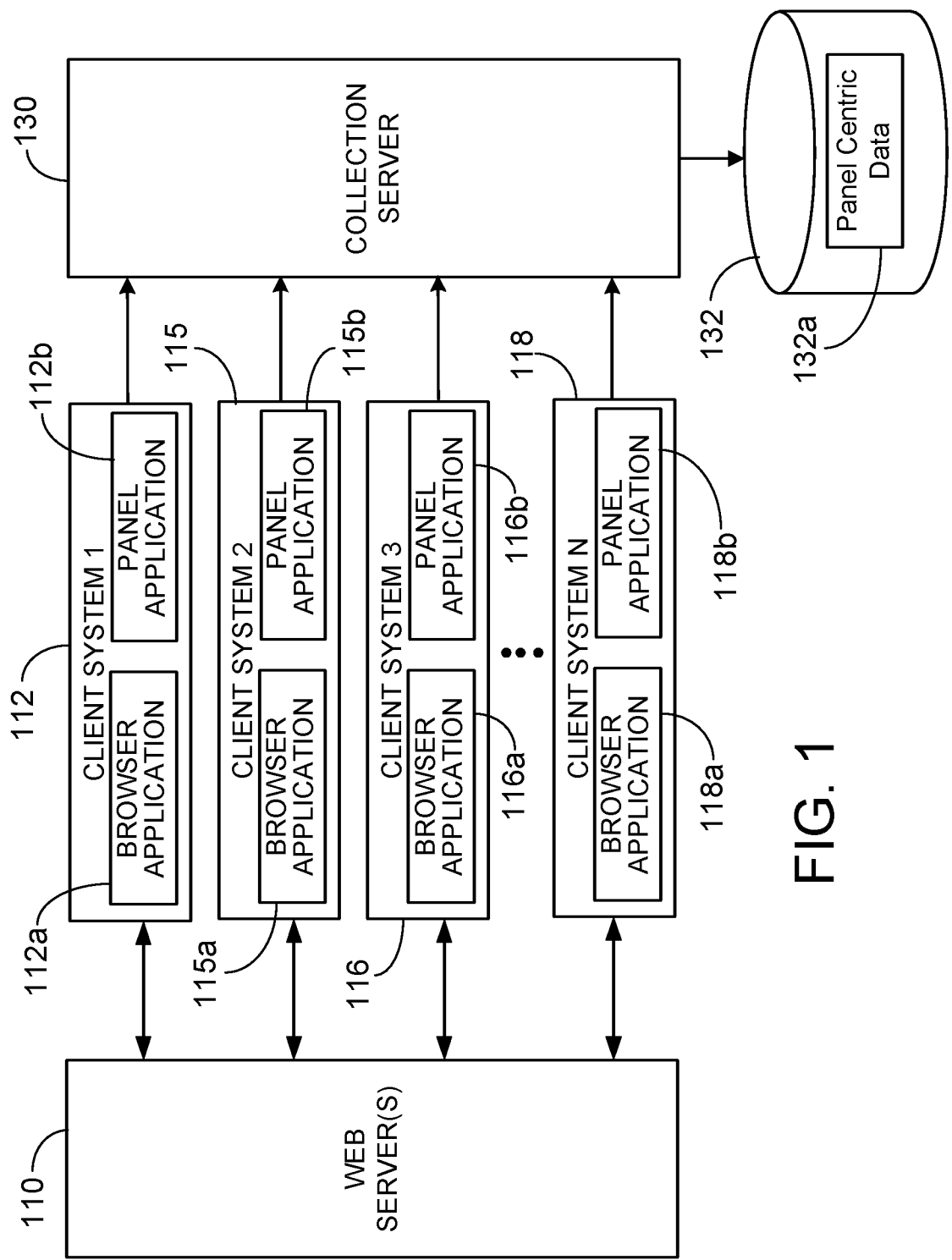
FIG. 1 illustrates an example of a system in which a panel of users may be used to perform Internet audience measurement.

FIG. 1 illustrates an example of a system 100 in which a panel of users may be used to collect data for Internet audience measurement. As described in more detail below, data from the panel of users may be used to correct or adjust beacon-based data for personal computers (e.g., non-mobile, non-shared use devices).

The system 100 includes client systems 112, 114, 116, and 118, one or more web servers 110, a collection server 130, and a database 132. In general, the users in the panel employ client systems 112, 114, 116, and 118 to access resources on the Internet, such as webpages located at the web servers 110. Information about this resource access is sent by each client system 112, 114, 116, and 118 to a collection server 130. This information may be used to understand the usage habits of the users of the Internet.

Each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy. In other implementations, the client systems 112, 114, 116, and 118 may send data to different collection servers. In this implementation, the data, which represents data from the entire panel, may be communicated to and aggregated at a central location for later processing. The central location may be one of the collection servers.

The users of the client systems 112, 114, 116, and 118 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the client systems 112, 114, 116, and 118 are a group of client systems that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies The users in the panel may be recruited by an entity controlling the collection server 130, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited, a monitoring application is installed on the user's client system. The monitoring application collects the information about the user's use of the client system to access resources on the Internet and sends that information to the collection server 130.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 100, a monitoring application 112b, 114b, 116b, and 118b, also referred to as a panel application, is installed on each of the client systems 112, 114, 116, and 118. Accordingly, when a user of one of the client systems 112, 114, 116, or 118 employs, for example, a browser application 112a, 114a, 116a, or 118a to visit and view web pages, information about these visits may be collected and sent to the collection server 130 by the monitoring application 112b, 114b, 116b, and 118b. For instance, the monitoring application may collect and send to the collection server 130 the URLs of web pages or other resources accessed, the times those pages or resources were accessed, and an identifier associated with the particular client system on which the monitoring application is installed (which may be associated with the demographic information collected regarding the user or users of that client system). For example, a unique identifier may be generated and associated with the particular copy of the monitoring application installed on the client system. The monitoring application also may collect and send information about the requests for resources and subsequent responses. For example, the monitoring application may collect the cookies sent in requests and/or received in the responses. The collection server 130 receives and records this information. The collection server 130 aggregates the recorded information from the client systems and stores this aggregated information in the database 132 as panel centric data 132a.

The panel centric data 132a may be analyzed to determine the visitation or other habits of users in the panel, which may be extrapolated to the larger population of all Internet users. The information collected during a particular usage period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The usage behavior of the weighted and projected sample (either user or client system) may then be considered a representative portrayal of the behavior of the defined universe (either user or client system, respectively). Behavioral patterns observed in the weighted, projected sample may be assumed to reflect behavioral patterns in the universe.

Estimates of visitation or other behavior can be generated from this information. For example, this data may be used to estimate the number of unique visitors (or client systems) visiting certain web pages or groups of web pages, or unique visitors within a particular demographic visiting certain web pages or groups of web pages. This data may also be used to determine other estimates, such as the frequency of usage per user (or client system), average number of pages viewed per user (or client system), and average number of minutes spent per user (or client system).

As described further below, such estimates and/or other information determined from the panel centric data may be used with data from a beacon-based approach to generate reports about audience visitation or other activity. Using the panel centric data with data from a beacon-based approach may improve the overall accuracy of such reports.

Figure 2:
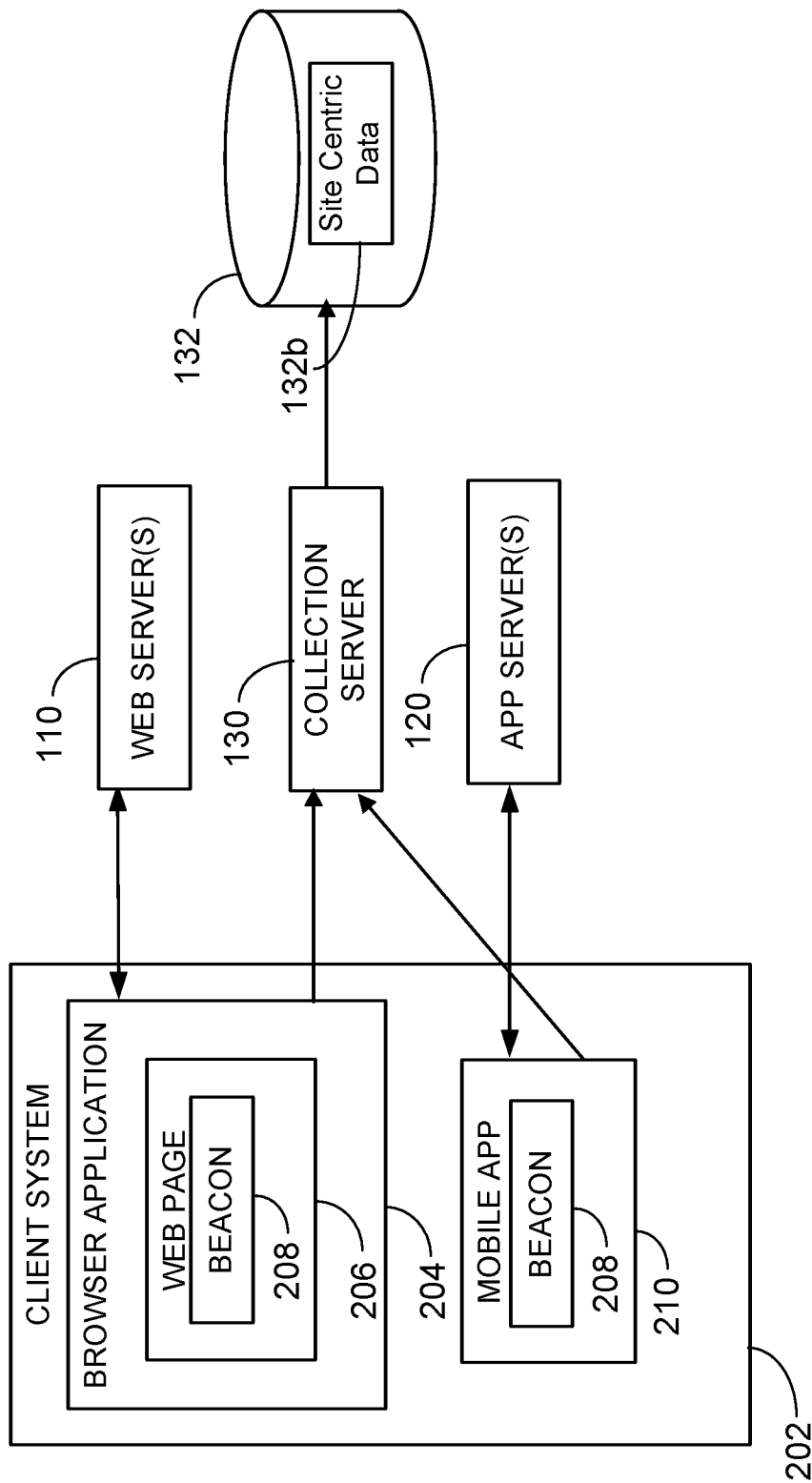
FIG. 2 illustrates an example of a system in which site centric data can be obtained by including beacon code in one or more web pages.

Referring to FIG. 2, a beacon-based approach may be implemented using a system 200. In general, a beacon-based approach may entail including beacon code in one or more web pages.

System 200 includes one or more client systems 202, the web servers 110, the collection servers 130, and the database 132. The client systems 202 can include client systems 112, 114, 116, or 118, which have the panel application installed on them, as well as client systems that do not have the panel application installed. Client systems may include personal computing devices, mobile computing devices, shared use computing devices, or any other device with access to the Internet.

The client systems include a browser application 204 that retrieves web pages 206 from web servers 110 and renders the retrieved web pages. Some of the web pages 206 include beacon code 208. In general, publishers of web pages may agree with the entity operating the collection server 130 to include this beacon code in some or all of their web pages. This code 208 is rendered with the web page in which the code 208 is included. When rendered, the code 208 causes the browser application 204 to send a message to the collection server 130. This message includes certain information, such as the URL of the web page in which the beacon code 208 is included. For example, the beacon code may be JavaScript code that accesses the URL of the web page on which the code is included, and sends to the collection server 130 an HTTP Post message that includes the URL in a query string. Similarly, the beacon code may be JavaScript code that accesses the URL of the web page on which the code is included, and includes that in the URL in the "src" attribute of an <img> tag, which results in a request for the resource located at the URL in the "src" attribute of the <img> tag to the collection server 130. Because the URL of the webpage is included in the "src" attribute, the collection server 130 receives the URL of the webpage. The collection server 130 can then return a transparent image. The following is an example of such JavaScript:

The message may also include a unique identifier for the client system. For example, when a client system first sends a beacon message to the collection server 130, a unique identifier may be generated for the client system (and associated with the received beacon message). That unique identifier may then be included in a cookie that is set on that client system 202. As a result, later beacon messages from that client system may have the cookie appended to them such that the messages include the unique identifier for the client system. If a beacon message is received from the client system without the cookie (e.g., because the user deleted cookies on the client system), then the collection server 130 may again generate a unique identifier and include that identifier in a new cookie set of the client system.

The client system 202 may further include a specialized application such as a mobile app 210 for accessing data associated with a network resource. In some implementations, a mobile app 210 may communicate with an app server 120 to send and receive data. The app server 120 may be a function of a general purpose web server 110 as above or may instead be a separate server dedicated only to proprietary applications such as the mobile app 210. In addition to accessing information associated with a resource, the mobile app may also include code 208 that includes beacon instructions for reporting usage data to the collection server 130. The beacon instructions provided to the mobile app 210 may be similar to the beacon instructions provided on the web page 206 to the browser application, but may include different information available to the mobile app 210, such as a unique device identifier.

The beacon messages are generally sent regardless of whether or not the given client system has the panel application installed. But, for client systems in which the panel application is installed, the panel application also records and reports the beacon message to the collection server 130. For example, if the panel application is recording HTTP traffic, and the beacon message is sent using an HTTP Post message (or as a result of an <img> tag), then the beacon message is recorded as part of the HTTP traffic recorded by the panel application, including, for instance, any cookies that are included as part of the beacon message. Thus, in this instance, the collection server 130 receives the beacon message as a result of the beacon code, and a report of the beacon message as part of the panel application recording and reporting network traffic.

Accordingly, as users of client systems 202 access webpages (e.g., on the Internet), the client systems 202 access the webpages that include the beacon code, which results in messages being sent to the collection server 130. These messages indicate the webpage that was accessed

```
<script type="text/javascript">
document.write("<img id='img1' height='1'
width='1'>");document.getElementById("img1").src="http://example.com/scripts/report.dll?C7=
" + escape(window.location.href) + "&rn=" + Math.floor(Math.random( )*99999999);
</script>
```

The collection server 130 records the webpage URL received in the message with, for instance, a time stamp of when the message was received, the IP address of the client system from which the message was received, and the user-agent information in the user-agent header. The collection server 130 aggregates this recorded information and stores this aggregated information in the database 132 as site centric data 132b.

(e.g., by including the URL for the webpage), potentially a unique identifier for the client system that sent the message, and a user-agent of the client system. When a message is received at the collection server 130, a record may be generated for the received message. The record may indicate an identifier (e.g., the URL) of the webpage accessed by the client system, the unique identifier for the client system, a time at which the client system accessed the webpage (e.g., by including a time stamp of when the message was received by the collection server 130), a network address, such as an IP address, of the client system that accessed the webpage, and the user-agent, when appropriate. The collection server 130 may then aggregate these records and store the aggregated records in the database 132 as site centric data 132b.

The site centric data 132b includes information about the accesses by a number of different types of client systems, such as mobile client systems, shared use client systems, and non-mobile, non-shared use personal computers. The site centric data 132b directly represents accesses by the members of the larger universe to be measured, not just the members of the panel, but because different devices are included in the data, there may be overlap between users of the different types of devices, with no ready mechanism to determine that the same user accessed a resource from, for example, both a mobile device and a personal computer. This may skew measurements of unique visitors to a given resource or group of resources and potentially inflate unique visitor estimates. Furthermore, because of the technology involved with each type of device, there may be inaccuracies when determining the unique visitors within a given type of device. The following describes various techniques for correcting such data within a given class of device, as well as when the data among device classes is combined.

Figure 3:
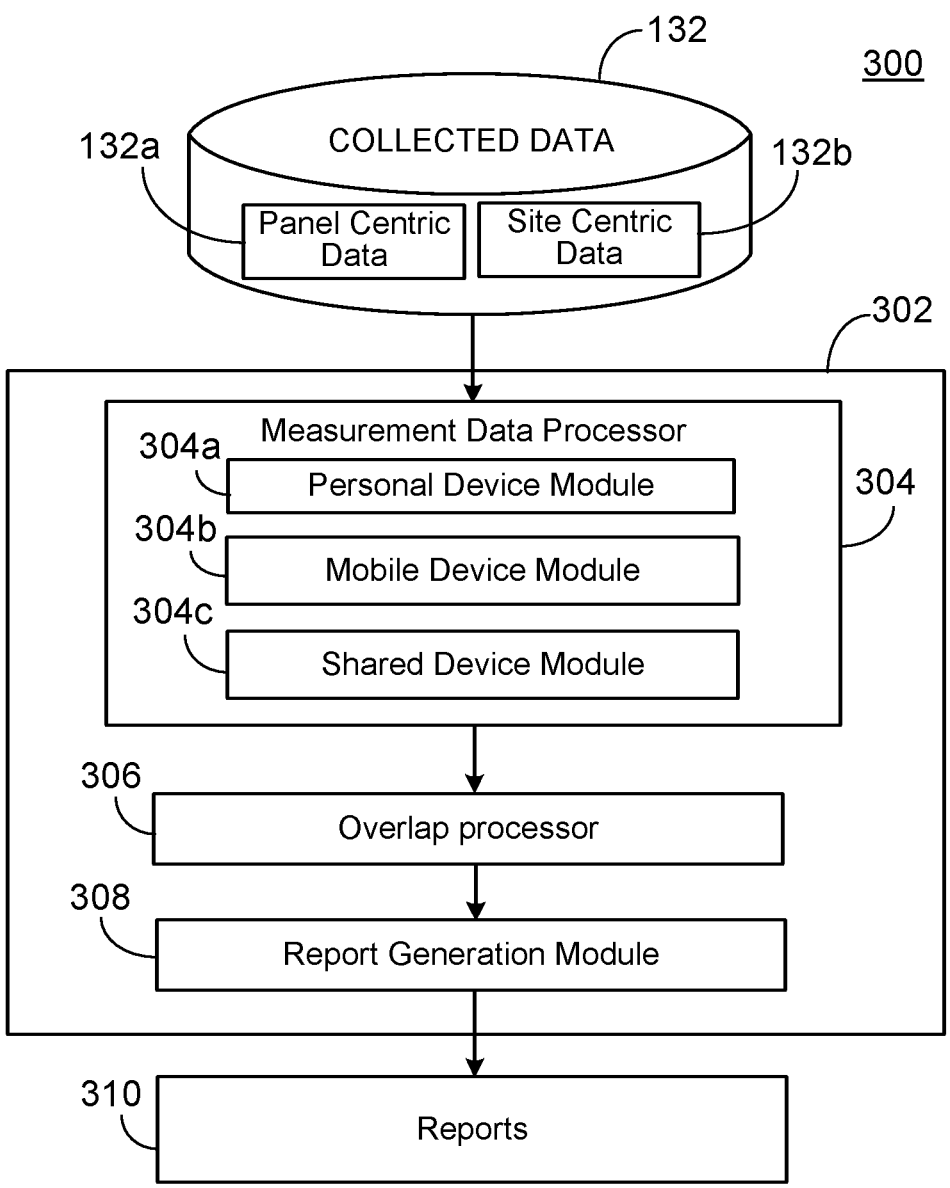
FIG. 3 illustrates an example of a system in which panel centric data and site centric data can be used to generate measurement data.

FIG. 3 illustrates an example of a system 300 in which panel centric data 132a and site centric data 132b can be used to generate measurement data. The system 300 includes a reporting server 302. The reporting server 302 may be implemented using, for example, a general-purpose computer capable of responding to and executing instructions in a defined manner, a personal computer, a special-purpose computer, a workstation, a server, or a mobile device. The reporting server 302 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 302.

The reporting server 302 executes instructions that implement a measurement data processor 304, an overlap processor 306, and a report generation module 308. The measurement data processor 304 includes a personal device module 304a, a mobile device module 304b, and a shared use device module 304c.

The measurement data processor 304 may access the raw panel centric data 132a and the raw site centric data 132b and perform one or more pre-processing functions on the accessed panel centric data 132a and the accessed site centric data 132b. As described above, the panel centric data 132a indicates a first set of resources accessed by a first set of client systems (those in the panel) and the site centric data 132b indicates a second set of resources accessed by a second set of client systems. Some of the second set of client systems are potentially in the panel and some of the second set of client systems are potentially not in the panel. Further, the second set of resources may include one or more resources that are also included in the first set of resources.

The panel centric data 132a may include records that reflect the URLs or other identifiers of web pages or other resources accessed, the times those pages or resources were accessed, identifiers of the client systems that accessed the resources, and information about the requests and responses used to access the resources (for example, cookies sent in requests and/or received in the responses). The site centric data 132b may include records that reflect a URL or other identifier of a resource that has been accessed by a client system, a network address of the client system that accessed the resource, a time that the client system accessed the resource (for example, as reflected by a time stamp of the time at which the beacon message was received by the collection server 130), and a unique identifier for the client system that accessed the resource (for example, included in a cookie attached to the beacon message).

The panel centric data 132a and the site centric data 132b that is accessed by the personal device module 304a may be the data that is aggregated for a certain, previous time period. For example, the accessed data may be the panel centric data 132a and the site centric data 132b aggregated over the previous 30 days.

The measurement data processor 304 may process the raw panel centric data 132a to form state data that represents the complete fact of usage in a single record. For instance, for web page visitation, a record in the state data may indicate that a particular user, on a particular date, at a particular time, accessed web page B (as represented by the URL for that web page), using a particular client system. The measurement data processor 304 also may match some or all of the URLs in the records of the state data to patterns in a dictionary of the Internet, which may organize various different URLs into digital media properties, reflecting how Internet companies operate their businesses. Each pattern may be associated with a web entity, which may be a web page or collection of web pages that are logically grouped together in a manner that reflects how Internet companies operate their business. For example, the various web pages that are included in the finance.yahoo.com domain may be logically grouped together into a single web entity (e.g., Yahoo Finance). The dictionary may include a number of hierarchically web entities to reflect various Internet media companies and how those companies arrange their web properties. For example, the Yahoo Finance web entity may be considered a subset of the Yahoo web entity, which may cover all of the various web pages included in the yahoo.com domain. The Yahoo web entity may include other web entities, such as a Yahoo Health web entity (associated with the various web pages in the health.yahoo.com domain). The measurement data processor 304 may associate a given state record with the lowest-level web entity associated with the pattern matching the URL in the state record.

The measurement data processor 304 may also remove from the panel centric data 132a records for users that are not to be included in the reporting sample. For example, there may be rules that are evaluated to insure that a complete record of a user's usage and non-usage during the reporting period is received. If those rules are not met, the user may be removed from the reporting sample. Also, a user may be removed if he or she does not meet certain criteria, such as being in a particular geographic area.

In addition, the personal device module 304a may remove certain types of records. For instance, records that reflect redirects or that reflect non-human initiated request (e.g., requests made as part of rendering a web page) may be removed.

The measurement data processor 304 may process the site centric data 132b to also match some or all of the URLs in the records of the site centric data 132b to patterns in the dictionary so as to associate the records with a web entity, such as the lowest level web entity in a hierarchy. Processing actions may then be performed on a per-web-entity basis to determine the measurement data 306. For example, processing may be performed for each of the lowest-level web entities, or may be performed for one or more higher level web entities, with the dictionary being used to collect the data associated with all of the lowest-level web entities included in the higher level web entity.

In addition, the measurement data processor 304 may remove certain records from the site centric data 132b. For example, the personal device module 304a may remove records that reflect non-human initiated accesses from the site centric data 132b. For example, a list of known search index crawlers or other robots may be used to remove records that reflect accesses from those bots. Additionally, or alternatively, if the records indicate that sequential accesses to the same or different web pages in a web entity by a particular client system occur at a defined frequency (for example, if the accesses are spaced three seconds apart or less), then accesses subsequent to the first one may be removed. This may help to remove records from non-human initiated accesses, as well as errors associated with the beacon code that may result in more than one beacon message per access.

The measurement data processor 304 may categorize the records according to device type. For instance, records for mobile devices may be detected and categorized accordingly. In some implementations, such records may be detected based on user agent or other data sent with the beacon message and recorded in the record. The measurement data processor 304 may also detect records for non-mobile, shared use client systems and categorize them accordingly. Techniques such as those described with respect to FIG. 12 may be used to detect non-mobile, shared use systems. The remaining non-categorized records may be marked as non-mobile, non-shared use systems (or other techniques may be used to detect records from such systems—for example, such systems may be detected based on the user agent data).

In addition, records may be removed for client systems not in a particular geographic area (e.g., if the reports are being generated for a particular geographic area, such as North America). The country and region of the client system corresponding to the record may be determined based on a reverse lookup of the network address (e.g., a reverse lookup of the IP address). Similarly, shared use client systems (e.g., client systems available to the public in a library) may be detected by analyzing the network access provider based on a reverse look-up of the client system's IP address (which may be captured with the beacon message).

The various modules 304a, 304b, and 304c of the measurement data processor 304 may implement various processes as describe below to generate adjusted measurement data for each category or class of device. The overlap processor 306 may implement one or more processes to combine the adjusted measurement data for the categories of devices in a manner that attempts to remove overlap of users between each category. The report generation module 308 may use the combined measurement data 306 to generate one or more reports 310 that include information regarding client system accesses of one or more resources.

Establishing Unique Visitors on Non-Mobile, Non-Shared Use Devices

Personal computing devices are conventional devices that generally have a small set of users. Personal devices may include both work computers and computers in the user's home. Personal computers, at least at present, are the most likely type of interne device to allow the user to install panel software, and are also the most likely to keep and hold cookies over long periods of time. For this reason, in some implementations, usage data for personal computing devices is based primarily on beacon data but refined using panel data and other factors as further described herein.

Figure 4:
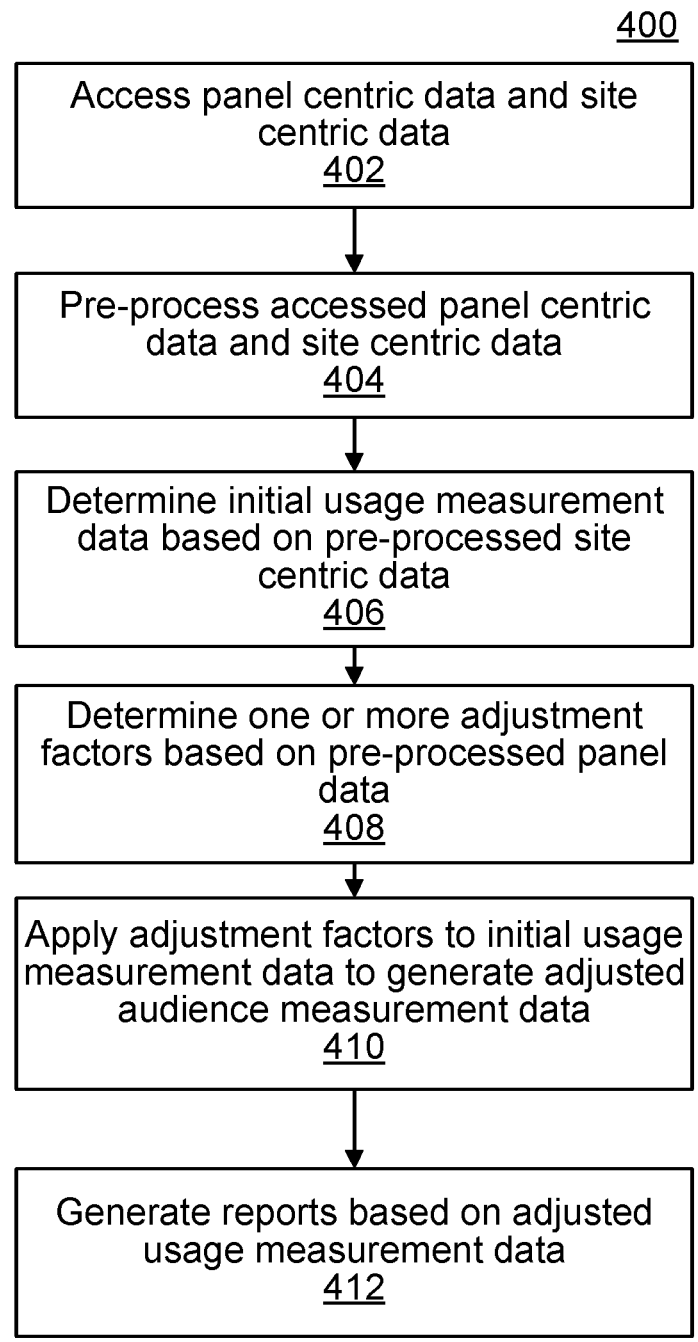
FIG. 4 is a flow chart illustrating an example of a process for determining audience measurement reports for a given web page or collection of web pages.

FIG. 4 is a flow chart illustrating an example of a process 400 for determining audience measurement reports for a given web page or collection of web pages. The following describes process 400 as being performed by the personal device module 304a. However, the process 400 may be performed by other systems or system configurations.

The personal device module 304a accesses the panel centric data 132a and non-mobile, non-shared use site centric data 132b (402) and perform some pre-processing of the accessed data (404). Pre-processing of both the accessed panel centric data 132a and the accessed site centric data 132b may involve delineating between classes of client systems. At times, it may be desirable to segment reports according to classes of non-mobile, non-shared use client systems. For example, in one implementation, the reports and underlying data, at least initially, are segmented into work vs. home client systems, with home client systems being those that are used at home while work client systems are those used at work. These two subpopulations can be identified and separated in the accessed panel centric data 132a because users self-identified the machines as home or work (or another class) when registering. To identify and separate these two sub-populations in the accessed site-centric 132b, the beacon messages received between 8 am and 6 pm local time Monday through Friday may be assumed to be work generated traffic. All other traffic may be aligned as targets for the Home sample.

In another example for identifying and separating these two subpopulations in the accessed site centric data 132b, a model may be developed based on observed work behavior in the panel centric data 132a. This model may be based on time of day and day of week usage profiles. If an IP address matches the expected profile for a work machine, all traffic for that IP address may be considered work traffic. For instance, panel data may indicate that, if the number of accesses during a first time period (a work time) is greater than the number of accesses during a second time period (a home time period) by a certain amount, then a machine is probably a work machine. This information may be used, together with the site-centric data, to classify network access providers into work or home based on the whether or not accesses by users of those network access providers are greater during the work time than the home time, on average, by the certain amount. The network access provider of a given machine may then be determined based on that machine's IP address, and that machine may be classified as the same class as the network access provider.

Actions 406 to 410 then may be separately performed on the data in each subpopulation, thereby generating measurement data for the home population and measurement data for the work population. Reports then may be generated for each of these subpopulations separately, or a combined reports may be generated, as further described with respect to action 412. Other implementations may similarly divide among several subpopulations.

The personal device module 304a determines initial usage measurement data based on the pre-processed site centric data (406). For example, the personal device module 304a may determine an initial measurement of unique visitors for a given web entity. Unique visitors may represent the number of unique people that requested and/or viewed one of the web pages of the web entity. To determine the initial measurement of unique visitors, for instance, the personal device module 304a may count the number of unique cookies (that is, number of cookies with a different unique identifier) received as part of the beacon messages received for the web entity.

As another example, the personal device module 304a may determine an initial measurement of page views for a given web entity. Page views may represent the number of times the web pages for a web entity were requested and/or viewed (regardless of whether the web pages were requested or viewed by a unique person). In this case, the personal device module 304a may count the total number of beacon messages received for the web entity.

The personal device module 304a determines one or more adjustment factors based on the pre-processed panel centric data (408). The initial audience measurement data, determined based solely on the pre-processed site centric data, may not be accurate for a number of reasons. The pre-processed panel centric data may be used to determine adjustment factors to correct the inaccuracies.

For example, if the initial measurement of unique visitors is based on cookies received with the beacon measurements, then there may be over or under counting of unique visitors because the cookies are set on a machine and browser basis, and not a person basis. In other words, even though multiple people may use a particular client system, only a single cookie may be set and counted for a given machine and browser. This may result in the undercounting of unique visitors.

In addition, a previously set cookie on a client system may be deleted, resulting in a new cookie and new identifier being set for further accesses during the reporting time period. As a result, accesses by the same user may be mistakenly identified as accesses from two different users, which may result in the overcounting of unique visitors. Similarly, a user may use multiple browsers, with different cookies being set for each browser. As a result, there may be multiple, different cookies for a single user because that user uses different browsers on the same machine. This may result in overcounting of unique visitors.

To account for such inaccuracies in the site centric data 132b, a cookie-per-person adjustment factor may be determined based on the pre-processed panel centric data. This adjustment factor may be determined on a web entity basis. This cookie-per-person adjustment factor may reflect the number of cookies that are set per person visiting beaconed web pages (that is, web pages that include the beacon code) of the web entity. As a result, this adjustment factor may be used to adjust the total count of unique visitors to compensate for multiple cookies per person or, conversely, multiple persons per cookie. This adjustment factor may be determined, for example, by using process 500 described with respect to FIG. 5.

Also, a given user may have and use multiple client systems in a given location (for example, at home). As a result, separate cookies may be set on the multiple client systems, and counted, even though only a single user is visiting the web entity. This may lead to an overcounting of unique visitors. To account for this inaccuracy, a machine overlap adjustment factor may be determined based on the pre-processed panel centric data. This adjustment factor may be determined on a web entity basis. This machine overlap adjustment may reflect the number of client systems being used per person that visits the web entity and can, therefore, adjust the total count of unique visitors to adjust for multiple cookies per person that result from a person using more than one client system to visit the web entity. This adjustment factor may be determined, for example, by using process 600 described with respect to FIG. 6.

Furthermore, if the initial measurement of unique visitors or page views is based on receiving a beacon message from beacon code included in the web pages for the web entity, there may be undercounting of either of these measurements as a result of beacon code not being included on all of the web pages for a given web entity. This may be the result of incorrect implementation of the beacon code (for example, the beacon code is not properly placed on all web pages that are part of the web entity), or not possible for certain policy reasons. For example, one lower level web entity may choose to include beacon code on all of the web pages for that entity, while another lower level web entity may choose to not include beacon code at all. If those lower level entities are underneath the same higher level web entity, then the beacon code cannot be implemented on all of the web pages for the higher level entity since one of the lower level entities has chosen to not include beacon code. As a particular example, the MSN® website (msn.com) and the Hotmail® website (hotmail.com) may both be separate web entities under the higher level web entity designated as Microsoft®. However, these two websites may be separately operated and managed and, therefore, MSN®, for instance, may choose to beacon while Hotmail® does not. As a result, the initial audience measurement data (either page views or unique visitors) for the web entity Microsoft® does not include any counts for the Hotmail® webpages since Hotmail® does not include beacon code on the web pages for Hotmail®.

To account for inaccuracies in the page views or unique visitors that result from a failure to include beacon code in all of the web pages for a given web entity, a non-beaconed adjustment factor may be determined based on the pre-processed panel centric data. This adjustment factor may be determined on a web entity basis. Since, ideally, the panel applications capture all web traffic, visits to non-beaconed web pages for a given entity are also captured and reported by the panel applications. Thus, the pre-processed panel centric data may be used to determine a non-beaconed adjustment factor that reflects the number of page views or unique visits to web pages for the web entity that are not counted based on the beacon messages. This adjustment factor may be determined, for example, by using process 700 described with respect to FIG. 7.

The measurement adjustor module 304c applies the adjustment factors to the initial usage measurement data to generate adjusted usage measurement data 306 (410). For instance, in one implementation for audience measurement data that reflects unique visitors for a given web entity, the measurement adjustor module 304c may generate adjusted unique visitors data as follows:

$$Adj\ UVs = ((Init\ UVs/\text{Cookie-}Per\text{-Person})*\text{Machine Overlap}) + Non\text{-Beaconed}$$

where Adj UVs is the adjusted unique visitors count, Init UVs is the initial count of unique visitors based on the pre-processed site centric data, Cookie-Per-Person is the cookie-per-person adjustment factor, Machine Overlap is the machine overlap adjustment factor, and Non-Beaconed is the non-beaconed adjustment factor. The reciprocal of the Cookie-Per-Person adjustment factor (a Person-Per-Cookie adjustment factor) may be used by multiplying this factor times the Init UVs, rather than dividing.

As another example, in one implementation for audience measurement data that reflects the total page views of web pages for a given web entity, the measurement adjustor module 304c may generate adjusted page views data as follows:

$$\text{Adj PageViews} = \text{Init PageViews} + Non\text{-Beaconed}$$

where Adj PageViews is the adjusted page views count, Init PageViews is the initial page views count based on the pre-processed site centric data, and Non-Beaconed is the non-beaconed adjustment factor.

The report generation module 308 generates audience measurement reports based on the adjusted audience measurement data (412). For example, in an implementation in which the initial data is delineated between home and work client systems, the report generation module 308 may generate reports on unique visitors or page views for a given web entity for one or both of the home or work populations. Additionally, or alternatively, in such an implementation, the report generation module 308 may generate reports on unique visitors or page views for a given web entity that combine the home and work populations. In other words, the report generation module may combine the page views for the home and work populations into a combined count of page views and/or may combine the unique visitors for the home and work populations into a combined count of unique visitors.

In some implementations, when the report generation module 308 produces a combined count of unique visitors, the report generation module takes into account the number of users that are present in both the home and work populations. In some cases, a person may visit a web page for the web entity from both a home client system and a work client system. As a result, if the count of the user in the home population was simply added to the count of the user in the work population, then the user would be counted twice. The report generation module 308 may use panel centric data 132a to determine the amount of user overlap between the two populations, and remove duplicate counts. For instance, a number of users may install the monitoring application on both work client systems and home client systems, and designate each one as such. Therefore, the data resulting from these users can be used to estimate the number of people that visit the web pages for the web entity using both home and work client systems, and this information can be used to de-duplicate those users in the combined count of unique visitors.

Figure 5:
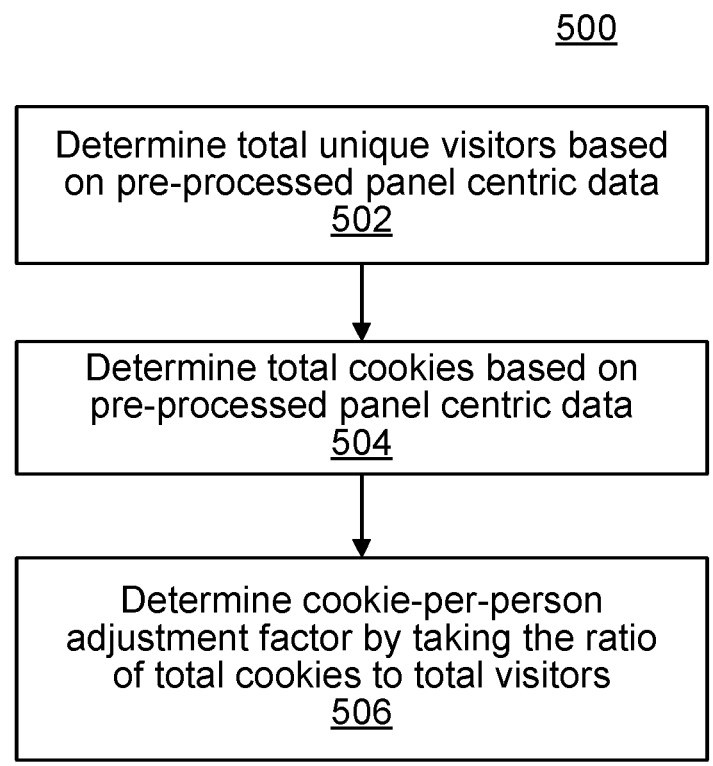
FIG. 5 is a flow chart illustrating an example of a process for determining a cookie-per-person adjustment factor.

FIG. 5 is a flow chart illustrating an example of a process 500 for determining a cookie-per-person adjustment factor. The following describes process 500 as being performed by the personal device module 304a. However, the process 500 may be performed by other systems or system configurations. As noted above, this adjustment factor may be used to adjust the initial audience measurement data for a given web entity. Thus, the following describes an implementation of process 500 in which the actions 502 to 506 are performed on a web entity basis.

The personal device module 304a determines, based on the pre-processed panel-centric data, a count of the total number of unique visitors that visited one of the beaconed web page of a given web entity (502). For instance, the total number of unique visitors may be determined by determining which members in the pre-processed panel have an associated beacon message as a result of visiting a web page of the web entity, and adding up the projection weights for each of these members. The projection weight for a given member may be the number of individuals that member represents in the total universe and, therefore, adding the projection weights for each of the determined members may provide the total number of individuals in the total universe that visited one of the beaconed web page of the web entity.

The personal device module 304a determines, based on the pre-processed panel-centric data, a count of the total number of beacon cookies for a given web entity (504). For example, the personal device module 304a may determine the client systems in the pre-processed panel centric data that accessed a beaconed web page of the web entity. For each of those client systems, the personal device module 304a may then determine the number of different cookies sent with the beacon messages (also referred to as "beacon cookies") from the client system during the reporting period. As described above, for client systems in which the panel application is installed, the panel applications can also record and report the beacon message and any associated cookie (beacon cookie). For each of those client systems, the personal device module 304a then may generate a projected cookie count for the client system by applying the projection weight for the user of the client system to the number of different beacon cookies sent by the client system during the reporting period. The personal device module 304a then adds the projected cookie counts together to determine a count of the total number of beacon cookies for the web entity. If there is more than one user of a given client system, the projection weights for those users may be averaged and the averaged weight may be applied to the count of different beacon cookies for that client system to determine the projected cookie count.

Once the total unique visitors and total cookies for a given web entity are determined, the personal device module 304a determines the cookie-per-person adjustment factor by taking the ratio of total cookies to total unique visitors. In other words, the personal device module 304a determines Cookie-Per-Person as:

$$\text{Cookie-}Per\text{-Person} = \text{Total Cookies}/\text{Total Unique Visitors}$$

where Total Cookies is a count of the total number of beacon cookies for the web entity and Total Unique Visitors is a count of the total number of unique visitors for the web entity. As noted above, the reciprocal of the Cookie-Per-Person adjustment factor (Person-Per-Cookie) may be used. The Person-Per-Cookie factor may be determined by determining Total Unique Visitors/Total Cookies.

Figure 6:
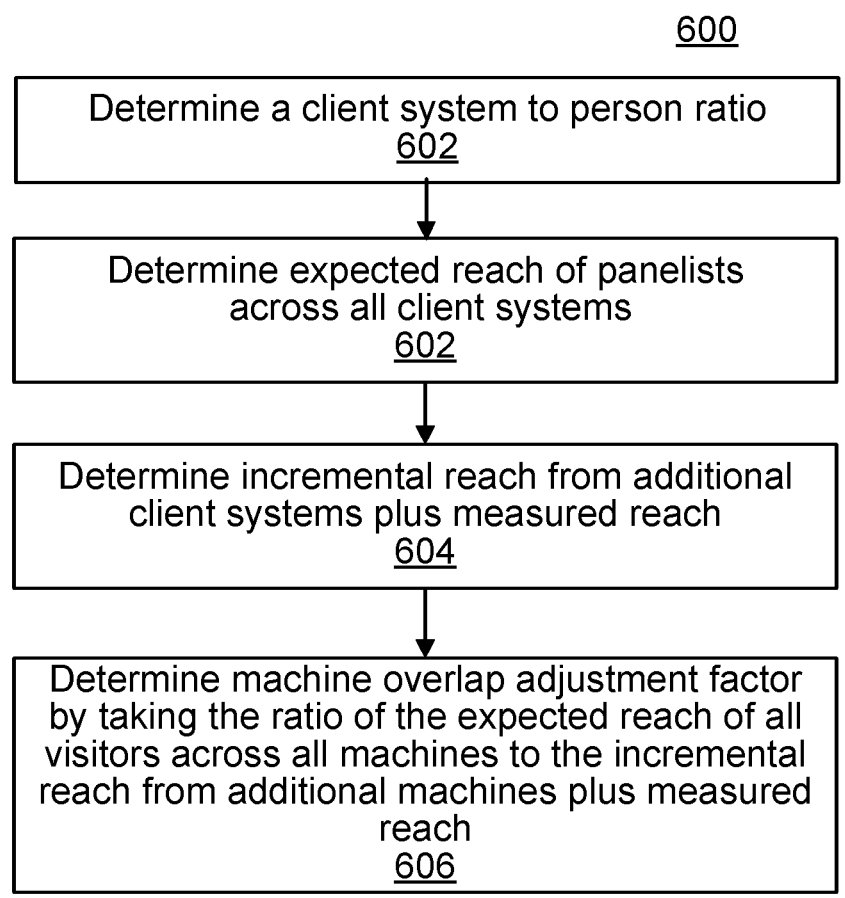
FIG. 6 is a flow chart illustrating an example of a process for determining a machine overlap adjustment factor.

FIG. 6 is a flow chart illustrating an example of a process 600 for determining a machine overlap adjustment factor. The following describes process 600 as being performed by the personal device module 304a. However, the process 600 may be performed by other systems or system configurations. As noted above, this adjustment factor may be used to adjust the initial audience measurement data for a given web entity. Thus, the following describes an implementation of process 600 in which the actions 602 to 606 are performed on a web entity basis.

The personal device module 304a determines, based on the pre-processed panel-centric data, a client system to person ratio for a given web entity (602). As described above, a given user may have and use multiple client systems in a given location (for example, at home). As a result, separate cookies may be set on the multiple client systems, and counted, even though only a single user is visiting the web entity. Based on the pre-processed panel centric data, a client system to person ratio for a given web entity can be determined for the entire universe of users and client systems being measured (e.g., the universe of all Internet users and client systems, or those in a particular geographic region). To determine the client system to person ratio for a given web entity, the personal device module 304a may determine the total number of client systems in the defined universe that accessed the web pages of the web entity and the total number of users in the defined universe that accessed the web pages of the web entity, and then determine the ratio of these two numbers.

As described above, there may be projection weights for projecting users to the total number of Internet users (or Internet users in a particular geographic region), or other defined user universe, as well as projection weights for projecting client systems to the total universe of client systems accessing the Internet (or, at least, the total in a particular geographic region), or other defined client system universe. Thus, to determine the total number of client systems in the defined universe that accessed the web pages of the web entity, the personal device module 304a may determine the client systems in the pre-processed panel centric data that accessed web pages of the web entity during the reporting period, and add up the projection weights for those client systems to determine the total number of client systems in the defined universe that accessed the web pages of the web entity. Similarly, to determine the total users, the personal device module 304a may determine the users in the pre-processed panel centric data that accessed web pages of the web entity during the reporting period, and add up the projection weights for those users to determine the total number of users in the defined universe that accessed the web pages of the web entity.

Based on the client system to person ratio, the personal device module 304a determines the expected reach based on all of the panelists in the pre-processed panel centric data across all of the client systems on which those panelists are active (604). In general, reach is the percentage of users, out of the total universe of users, that visited a web page of a given web entity during a certain period, such as the reporting period. In other words, reach is the percentage of the total possible visitors that visited a web page of the web entity.

The expected reach based on all panelists across all client systems on which they are active may be calculated using:

$$\frac{p\text{RE}}{1+(E-1)p^{ln\left(\frac{E-1}{S-1}\right)/ln(T)}}$$

Or $$\frac{(1+q)\text{RE}}{1+(E-1)(1+q)^{ln\left(\frac{E-1}{S-1}\right)/ln(T)}}$$

where:

$$\frac{M_p}{P_q};$$

p=the client system to person ratio, or
q=the incremental number of client systems used by people=(p−1), assuming no shared use machines such that people use at least one machine;
T=the reporting period measured in days (e.g., 30 days);
R=the projected reach over the reporting period T;
E=the frequency of visitations per visitor to a web page of the web entity during period T;
S=the average visits to a web page of the web entity per day during period T.

The projected reach, R, over the reporting period T may be determined by using the pre-processed panel centric data to determine the projected number of users that visited a web page of the web entity during the reporting period and dividing that value by the total estimated universe of users. The frequency of visitations per visitor to a web page of the web entity, E, may be determined by using the pre-processed panel centric data to determine the total visits to a web page of the web entity during the reporting period and the total visitors to a web page of the entity during the reporting period, and then dividing those two numbers. The average page visits to a web page of the web entity per day, S, may be determined by using the pre-processed panel centric data to determine the total number of unique visits in each day of the reporting period, add these values together, and then divide by the total number of days in the reporting period.

Based on the client system to person ratio, the personal device module 304a determines the incremental reach not measured due to the client systems used by members of the panel, but not included in the panel plus the reach, R, measured by the panel (506). This expected reach gain from the incremental machine activity not measured by the panel can be determined using:

$$\frac{q\text{RE}}{1+(E-1)q^{ln\left(\frac{E-1}{S-1}\right)/ln(T)}}$$

This incremental reach can then be added to the measured reach, R.

The personal device module 304a determines the machine overlap adjustment factor by determining the ratio of the expected reach across all client systems to the incremental reach plus measured reach (508). In other words, the personal device module 304a may determine the machine overlap adjustment factor based on the following:

$$\frac{\frac{(1+q)\text{RE}}{1+(E-1)(1+q)^{ln\left(\frac{E-1}{S-1}\right)/ln(T)}}}{R+\frac{q\text{RE}}{1+(E-1)q^{ln\left(\frac{E-1}{S-1}\right)/ln(T)}}}$$

Which simplifies to:

$$\frac{\frac{(1+q)\text{E}}{1+(E-1)(1+q)^{ln\left(\frac{E-1}{S-1}\right)/ln(T)}}}{1+\frac{q\text{E}}{1+(E-1)q^{ln\left(\frac{E-1}{S-1}\right)/ln(T)}}}$$

As an alternative to first calculating the expected reach, calculating the incremental reach plus measured reach, and then dividing the two, the personal device module 304a may determine the machine overlap adjustment factor based directly on the simplified equation above. For instance, the personal device module 304a may determine the client system to person ratio as described above, determine the incremental number of client systems used by people based on the machine to person ratio (e.g., by determining p−1), determine the frequency of visitations per visitor to a web page of the web entity as described above, determine the average visits to a web page of the web entity per day as described above, and then determine the machine overlap adjustment factor based on q, E, S, and T using the simplified equation above.

Moreover, if the composition of users and client systems in the defined universe is estimated accurately and taken into account correctly when determining projection weights for the users and client systems in the panel, then the client system to person ratio may be used directly as the machine overlap adjustment factor. However, such perfect estimating and weighting may be very difficult to accomplish. For instance, there may be a mix of primary (those used by a user most often to access the Internet) and secondary (those use less often) machines in the panel, but the exact mix may not be known. So, depending on the sample composition and the site, the client system to person ratio may be skewed more towards secondary usage or primary usage. To compensate for such errors, the client system to person ratio may be used as described above with the expected and incremental reaches to determine a machine overlap adjustment factor that compensates for the possible errors in estimating the universe and weighting. If the simplified equation above is used and the expected combined reach is greater than the addition of incremental reach to measured reach, the sample is skewed more towards secondary usage for the web entity and the machine overlap factor will scale up unique visitors. On the other hand, if the expected combined reach is less than the addition of incremental reach to measured reach, then the sample is skewed more towards primary usage and the machine overlap adjustment factor will scale down unique visitors to account for incremental secondary usage.

Figure 7:
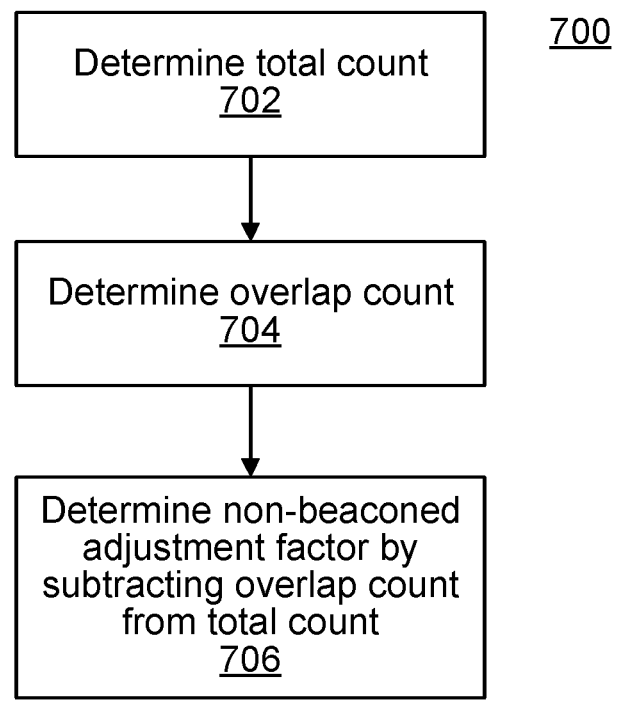
FIG. 7 is a flow chart illustrating an example of a process for determining a non-beaconed adjustment factor.

FIG. 7 is a flow chart illustrating an example of a process 700 for determining a non-beaconed adjustment factor. The following describes process 700 as being performed by the personal device module 304a. However, the process 700 may be performed by other systems or system configurations. As noted above, this adjustment factor may be used to adjust the initial audience measurement data for a given web entity. Thus, the following describes an implementation of process 700 in which the actions 702 to 706 are performed on a web entity basis.

The personal device module 304a, depending on the particular audience measurement, determines a total count of the unique visitors or page views for a given web entity based on the pre-processed panel-centric data (702). As described above, since, ideally, the panel applications capture all web traffic, visits to non-beaconed web pages for a given web entity are also captured and reported by the panel applications. As a result, the personal device module 304a may use the pre-processed panel data to determine a total count of the unique visitors or page views for a given web entity, even if all of the web pages for a web entity do not include beacon code.

For instance, the total number of unique visitors may be determined by adding up the projection weights for each of the members of the panel in the pre-processed panel centric data that visited a web page of the web entity. The total number of page views may be determined, for instance, by applying each member's projection weight to the count of page views for the member to generate a projected page views for the member, and then adding together all of the projected page views.

The personal device module 304a, depending on the particular audience measurement, determines an overlap count of the unique visitors or page views for a given web entity, based on the pre-processed panel-centric data (704). An overlap count of the unique visitors or page views are the number of unique visitors or page views attributable to visits to web pages that included the beacon code. To determine the overlap count of unique visitors, the personal device module 304a, for example, may add together the projection weights for members in the pre-processed panel centric data that visited a web page of the web entity and that sent a beacon message with a beacon cookie. To determine the overlap count of page views, the personal device module 304a, for example, may determine the members in the pre-processed panel centric data that visited a web page of the web entity and that sent a beacon message with a beacon cookie, determine the number of page views for each of those members, apply the projections weights for each member to the respective number of page views for the member to generate projected page views, and then add together the projected page views to obtain a total overlap count of page views.

The personal device module 304a, depending on the particular audience measurement, determines a non-beaconed adjustment factor by subtracting the total count of the unique visitors or page views for a given web entity from the overlap count of unique visitors or page views for the web entity (706). As noted above, the non-beaconed adjustment factor is used to adjust for the non-beaconed web pages. Thus, the overlap count is removed from the total count of unique visitors or page views (which includes unique visitors or page views for both web pages with beacon code and web pages without beacon code) to arrive at an adjustment factor that reflects unique visitors or page views attributable only to those web pages of the web entity that do not contain beacon code. In other words, Non-Beaconed is determined based on:

$$Non\text{-Beaconed}=\text{Total Count}-\text{Overlap Count}$$

where Total Count is the projected total count of unique visitors or page views for the web entity (for both beaconed and non-beaconed pages) based on the pre-processed panel centric data and Overlap Count is the projected count of unique visitors or page views attributable to web pages of the web entity that include beacon code.

The above techniques are used on usage data which is understood to represent personal computing devices, such as work and home computers. Once a count for unique visitors is determined for personal computing devices, this count is used along with other usage data in order to arrive at a total count of unique visitors over all devices as further described below.

Establishing Unique Visitors on Mobile Devices

Internet usage is not confined to home and work personal computers. Increasingly, mobile devices form an important component of the internet audience that a business may wish to measure.

Mobile devices may, in some cases, provide unique challenges to determining a count for unique visitors. The methods described rely on the use of cookie beacons and usage data based on beacon information. However, many mobile device platforms are unreliable in their acceptance and maintenance of cookies. For example, some mobile device platforms include internet browsers that refuse third-party cookies, and many have default settings that either refuse cookies or clear them quickly. This makes it more difficult to collect internet usage data that is measured, for instance, on a monthly basis.

In some implementations, mobile usage data will be collected both for devices having beacon cookies and for devices without cookies. For mobile devices without cookies, the device's IP address may be used to uniquely identify access by the device.

Figure 8:
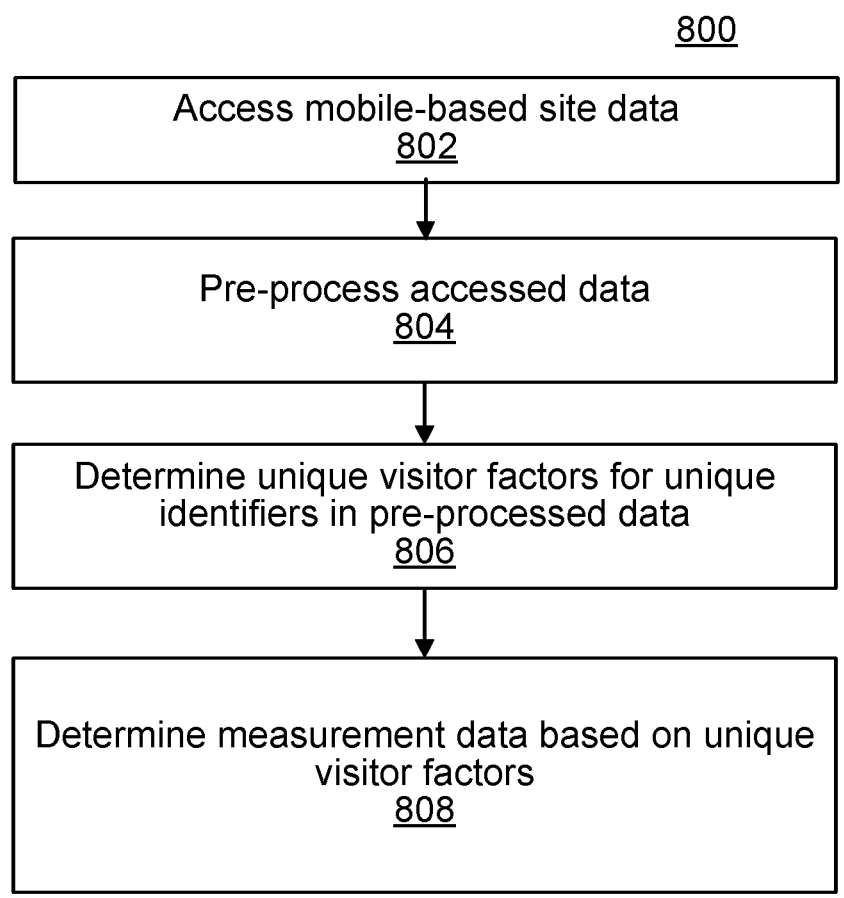
FIG. 8 is a flow chart illustrating an example of a process for determining measurement data for mobile devices.

FIG. 8 is a flow-chart illustrating an example of a process 800 for determining measurement data for mobile devices. The following describes process 800 as being performed by the mobile device module 304b. However, the process 800 may be performed by other systems or system configurations.

The mobile device module 304b accesses mobile-based site-centric data (802) and may perform some pre-processing (804). The pre-processing may include standardizing data if any of the servers use nonstandard formats, consolidating data from multiple sources, and eliminating or reclassifying data that does not fit with the remainder of the process. In some implementations, as part of pre-processing the usage data, data associated with mobile applications may be removed. This data may be processed separately as described further below.

The pre-processed data may include records with unique identifiers and, for a given unique identifier, information indicating each time a tracked resource was accessed (that is, each "hit"), along with a time stamp associated with each hit. When beacon cookies were include in the beacon messages, then the unique identifiers in the beacon cookies can be used. If a beacon cookie was not present, then a network identifier, such as an IP address, may be used as the unique identifier.

Once the data is pre-processed, the mobile device module 304b determines a unique visitor factor for each entry associated with a unique identifier (806). The unique visitor factor acts as an adjustment factor for unique identifiers that are not suitable for interpreting 1-for-1 as unique visitors. In general, under certain circumstances, a unique identifier can be considered to correspond to one person. As a result, an access of a resource associated with that unique identifier can be considered an access by one unique person. However, under certain circumstances, this assumption is not appropriate. For example, because many mobile device platforms are unreliable in their acceptance and maintenance of cookies, a given user may receive more than one cookie over a certain reporting time period (for example, one month) and, as a result, may be counted as more than one person. As a result, it may be appropriate to count such cookies as less than a person when determining unique views. As another example, IP addresses may be assigned to different people over the course of the reporting period. As a result, a given IP address may only be counted as one person when, in fact, it represents more than one person. As a result, it may be appropriate to count such IP addresses as more than a person when determining unique views.

In order to account for such circumstances, a consideration set of unique identifiers is developed and used to determine unique visitor factors for each unique identifier to act as adjustment factors. The consideration set is populated with those unique identifiers that have a high probability of corresponding to a single person. In one implementation, the consideration set is populated with unique identifiers that correspond to cookies that are present in the data over a duration that exceeds a persistence threshold. In other words, the consideration set corresponds to cookies that are present for a threshold amount of time during the reporting period. An example of a process for determining unique visitor factors is described below in conjunction with FIG. 9.

The measurement data is then determined based on the unique visitor factors (808). In some implementations, the unique factors can be summed over a set of data in order to arrive at a number of unique visitors. All the unique visitors factors associated with records meeting a particular criterion can be added up to determine a unique visitor count for that criterion. For example, the unique visitor factors for each record of a device accessing a particular web entity can be summed to a total number of unique visitors to that web entity.

Figure 9:
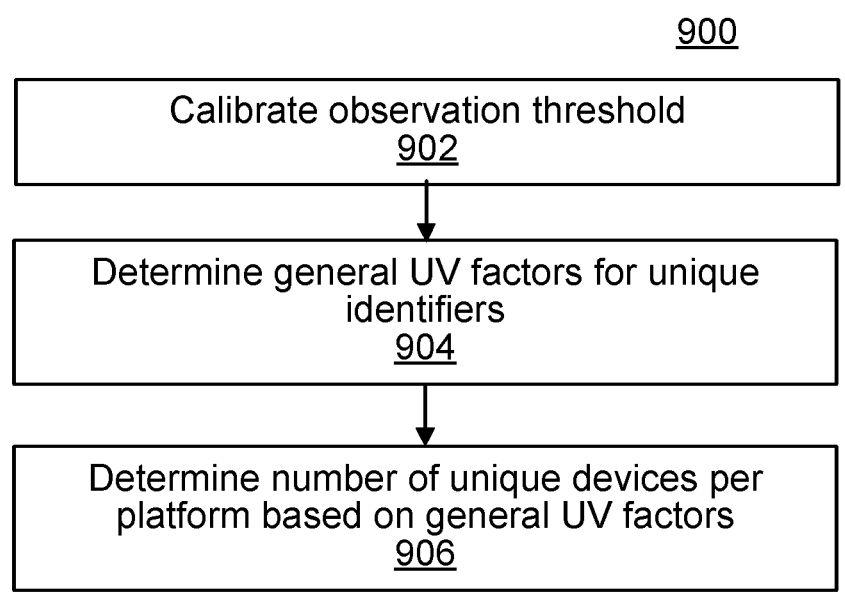
FIG. 9 is a flow chart illustrating an example of a process for assigning general unique visitor factors to mobile device usage data.

FIG. 9 is a flowchart illustrating an example of a process 900 for determining general unique visitor ("UV") factors for unique identifiers and using those to determine the number of devices per platform. Generally, the process involves defining a consideration set represented by persistent cookies—those cookies for which the record of activity exceeds a threshold. This data is used to evaluate the remainder of the data, which includes non-persistent cookies and persistent or non-persistent IP addresses.

The mobile device module 304b calibrates an observation threshold (902). The observation threshold may not be calibrated every time; in some implementations the threshold may be calculated off-line and only adjusted at a set interval, such as annually, even if other steps of the process 900 are carried out for each measurement period, such as monthly.

In some implementations, the calibration may involve comparing the data to some further external source that estimates the number of unique devices per platform. The data may be sorted or categorized to match the external source. For example, in some implementations, the data may include mobile devices from several different mobile platforms. Each platform represents a different basic software framework developed for mobile use, and includes a mobile device's operating system. The mobile device module 304b sorts the usage data according to the platform of the mobile device and compares the usage data to a source that gives an estimate of the number of unique devices per platform.

The mobile device module 304b may iterate through different observation thresholds until it finds one where the formula for calculating UVs based on categorizing the data into persistent and non-persistent records, as further described below, gives results that most closely match the estimated data. In other words, the mobile device module 304b may perform actions 904 and 906 using different values for the observation threshold to arrive at different counts for unique devices per platform. The mobile device module 304b may then select the observation threshold that results in the count of unique devices per platform to most closely match the external source for unique devices per platform. For example, the mobile device module 304b may calculate unique devices per platform based on an observation threshold of 5 days, 10 days, 15 days, and 20 days, and find that unique devices per platform calculated based on a 20-day observation threshold matches the estimated data more closely than the others. The mobile device module 304b may then calculate unique devices per platform based on observation thresholds of 20, 22, 24, and 26 days. Upon determining that an observation threshold of 24 days results in the closest match to the estimated data, 24 days may be used as the observation threshold (or "obs threshold").

The mobile device module 304b determines general UV factors for unique identifiers (904). Using the example of 24 days, the data is sorted based on its persistence and the presence or absence of a beacon cookie. Persistent cookies or IP addresses are those that include events over a longer period of time than the threshold. In some implementations, the difference in days between the most recent and the oldest time stamp associated with a cookie or IP address may be compared against a threshold, such as 24 days, such as by the use of the following equation:

$$days\_obs = newest\_stamp - oldest\_stamp$$

If the cookie's or IP address's timestamps span a duration equal to or exceeding the threshold, for example if the oldest stamp is at least 24 days older than the newest stamp, then the cookie may be classified as persistent. This yields four classes of data: persistent cookie data, non-persistent cookie data, persistent IP data, and non-persistent IP data. The following can be used to calculate the UV factor for each category.

| | |
|---|---|
| Persistent Cookie Data<br>Cookie = TRUE<br>days_obs >= obs_threshold | UV = 1 |
| Non-Persistent Cookie Data<br>Cookie = TRUE<br>days_obs < obs_threshold | UV = MIN (days_obs/<br>obs_threshold, hits/PCI) |
| Persistent IP Data<br>Cookie = FALSE<br>days_obs >= obs_threshold | UV = MAX (1, hits/PCI) |
| Non-Persistent IP Data<br>Cookie = FALSE<br>days_obs < obs_threshold | UV = MAX (1, hits/PCI) *<br>(days_obs/obs_threshold) |

The first category, persistent cookie data, may act as a consideration set and provide a baseline for the other categories. The UV factor for unique identifiers in this class is set to 1. That is, each cookie is considered to represent one unique visitor. In some implementations, the average number of hits per cookie for the data in this category is used to evaluate data in the other categories to set the UV factor. The average hits per cookie for data in the persistent cookie data category is referred to as the persistent cookie intensity, or "PCI".

The second category, non-persistent cookie data, may result in over-counting unique visitors if a UV factor is not applied. For example, a mobile device could clear and re-install cookies once a week, in which case one user may have accessed a resource with each of four different cookies. Ideally, each of these cookies is counted as only a fraction such that all of the cookies associated with one individual end up totaling to 1 in the UV count. This can be accounted for by setting the general UV factor to the minimum value of either the ratio of the days observed for the particular cookie (that is, the difference in days between the last and the first time stamp) and the threshold number of days to be considered persistent (days_obs/obs threshold) or the ratio of the hits from the particular unique identifier to the persistent cookie intensity (hits/PCI).

For IP address records (the third and fourth categories), multiple users may use the IP address over a month, which can result in under-counting. For example, several mobile devices connected through a wireless router may be considered to have the same IP address. Furthermore, many 3G and other mobile data services use floating IP addresses that may be assigned to several users over the course of the month. To compensate, the level of activity associated with the IP address may be used as a proxy for the number of individuals using it.

In particular, for persistent IP data (the third category), if a particular IP address had more hits than the average number of hits for persistent cookie data (that is, the persistent cookie intensity), then that IP address is assigned a UV factor of greater than 1 according to the ratio that it exceeds the PCI. In other words, the UV factor is set to the maximum value of either 1 or the ratio of hits from the particular IP address to the persistent cookie intensity (hits/PCI). For non-persistent IP data (the fourth category), the same formula is used, except that the UV factor is multiplied by a factor reflecting how short-lived the record is.

In some implementations, the above formulas may use the data specific to each platform. Particularly, the data may be segregated by platform and the UV factors calculated for each platform. In some implementations, persistent cookie data for each platform may be used to calculate a PCI that is specific to that platform, which is then used in determining the UV factor for the other classes of data for that platform.

The mobile device module 304b determines the number of unique devices per platform based on the general UV factors (906). For instance, the general UV factors for each platform can be summed to arrive at a total count of devices for that platform.

Figure 10:
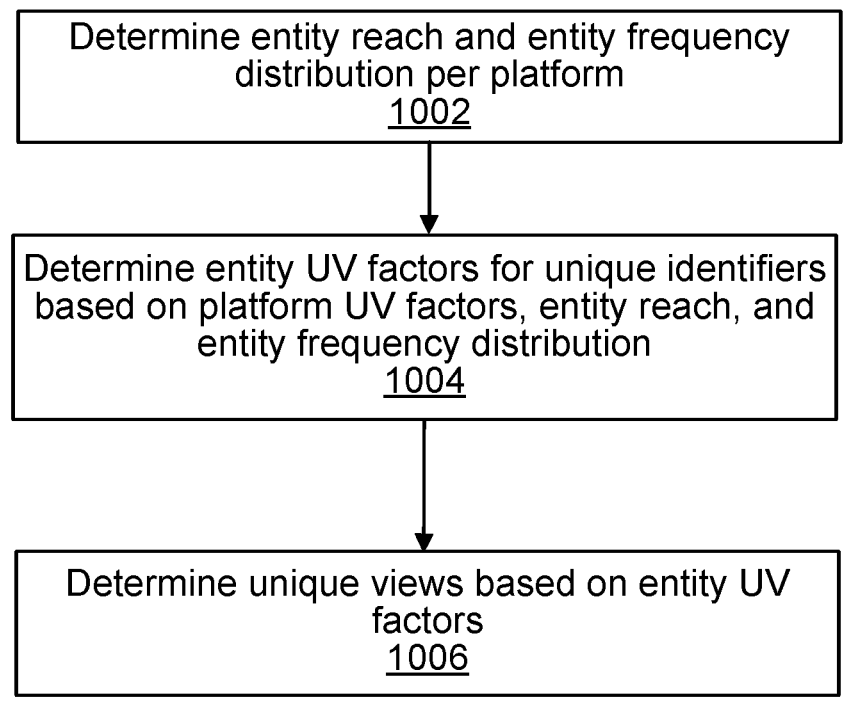
FIG. 10 is a flow chart illustrating an example of a process for calculating entity unique visitor factors.

FIG. 10 is a flowchart illustrating an example of a process 1000 for determining unique views for a resource or set of resources (generally referred to as an entity, as explained above). Generally, process 1000 involves determining an entity UV factor for each unique identifier that visited a given entity based on the general UV factors and the reach/frequency of the entity. The following describes process 1000 as being performed by the mobile device module 304b. However, the process 1000 may be performed by other systems or system configurations.

For a given entity represented in the mobile usage site-centric data, the mobile device module 304b determines an entity reach and a hit frequency distribution per platform (1002). The entity reach and hit frequency distribution is determined using the persistent cookie data. The entity reach can be determined as follows:

entity reach=(cookies *per* entity/total cookies over all entities)

where the cookies per entity is a count of the number of unique identifiers that accessed the entity and the total cookies over all entities is a count of the all the unique identifiers in the persistent cookie data. For example, if 80% of all persistent cookies have at least one hit on a given website, the reach for that entity will be 0.8.

The mobile device module 304b may also determine the hit frequency distribution for the entity for each platform. This represents the fraction of persistent cookies recording a particular number of hits for the entity, according to the persistent cookie data. For a particular platform and entity, a frequency distribution may look like this:

| | |
|---|---|
| 1 hit | 0.8 |
| 2 hits | 0.1 |
| 3 hits | 0.05 |
| 4 hits | 0.02 |
| 5 or more hits | 0.03 |

The entity reach and frequency distribution are both used in order to determine an entity UV factor for unique identifiers that do not correspond to persistent cookies (1004). For example, the following may be used to determine the entity UV for each unique identifier for a given entity:

| | |
|---|---|
| Persistent Cookie Data<br>Cookie = TRUE<br>days_obs >= obs_threshold | entity UV = 1 |
| Persistent IP Data<br>Cookie = FALSE<br>days_obs >= obs_threshold | entity UV = MAX (1, general<br>UV factor * reach) |
| Non-Persistent Cookie Data<br>Cookie = TRUE<br>days_obs < obs_threshold | entity UV =<br>{IF general UV factor > 1, general<br>UV factor * reach<br>IF general UV factor <=1, MAX (general<br>UV factor, entityfrequency)} |

| | |
|---|---|
| Non-Persistent IP Data<br>Cookie = FALSE<br>days_obs < obs_threshold | entity UV = MAX (general UV factor,<br>entity frequency) |

The general UV factor is the general UV factor described above and, when appropriate, is scaled by the reach to achieve the entity UV factor. The entity frequency refers to the hits frequency found in the frequency distribution for the particular entity and platform corresponding to the unique identifier. For example, a non-persistent cookie or IP with 3 hits would, based on the above example of a frequency distribution, have an entity frequency of 0.05.

The mobile device module 304b determines the number of unique web views (or accesses), as opposed to mobile app accesses, to the entity based on the entity UV factors (1006). For instance, the entity UV factors for each platform can be summed to arrive at a total count of unique views per platform, and then those unique views per platform can be summed.

Figure 11:
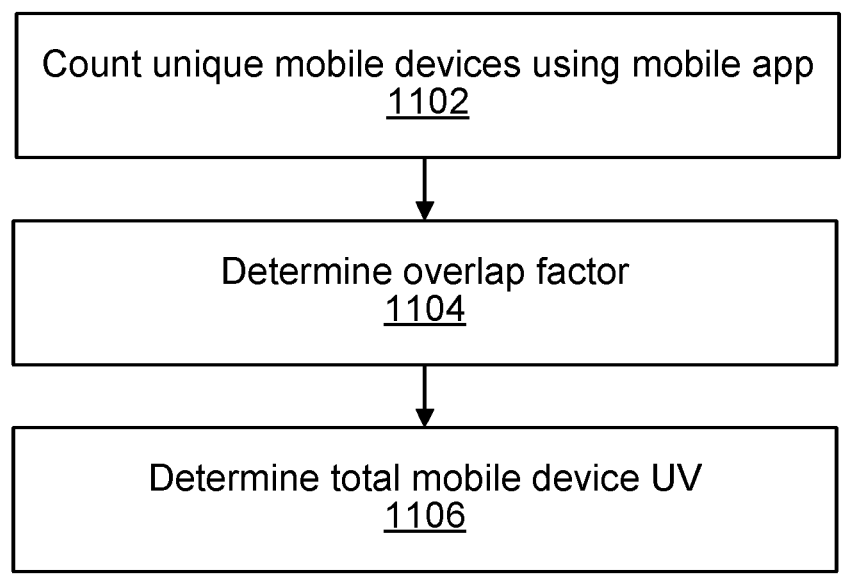
FIG. 11 is a flow chart illustrating an example of a process for measuring the total audience for mobile devices.

FIG. 11 is a flowchart illustrating an example of a process 1100 for determining total mobile unique views for an entity. Generally, in process 1100, entity accesses by mobile apps is added to the count of mobile web views in order to measure the total audience for mobile devices. The following describes process 1100 as being performed by the mobile device module 304b. However, the process 1100 may be performed by other systems or system configurations.

The mobile device module 304b counts the number of unique mobile devices using the mobile app to access the entity (1102). Referring briefly to FIG. 2, each mobile app 210 may have access to a unique device identifier for the mobile device upon which it resides and that device identifier may be returned in a beacon call. Therefore, the mobile device module 304b may count the number of unique mobile devices using the mobile app by counting the number of unique device identifiers recorded as having visited the entity. In some cases, the device identifiers are uniquely and permanently assigned to the device, so the issues related to mobile web views and cookies do not apply. As a result, in those circumstances, it may be assumed that each device identifier corresponds to one person.

The mobile device module 304b determines an overlap factor between the mobile web and mobile app accesses is determined (1104). While it may be appropriate to assume a unique device identifier corresponds to a single person, that person may nevertheless also have accessed the entity via the web page and, in a count of unique visitors, would be counted twice. The overlap factor may be used to take into account such overlap of visitation.

Figure 14:
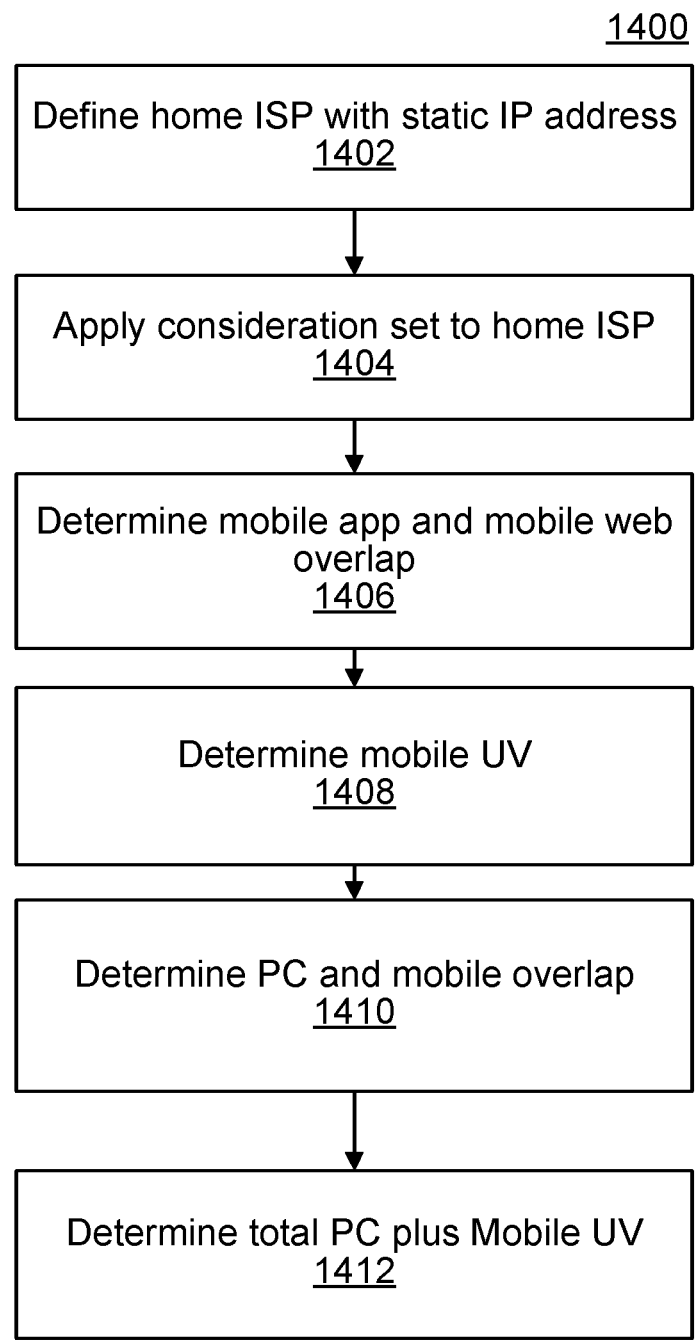
FIG. 14 is a flow chart illustrating an example of a process for combining personal device and mobile device unique visitor counts into a single unique visitor count.
Figure 15:
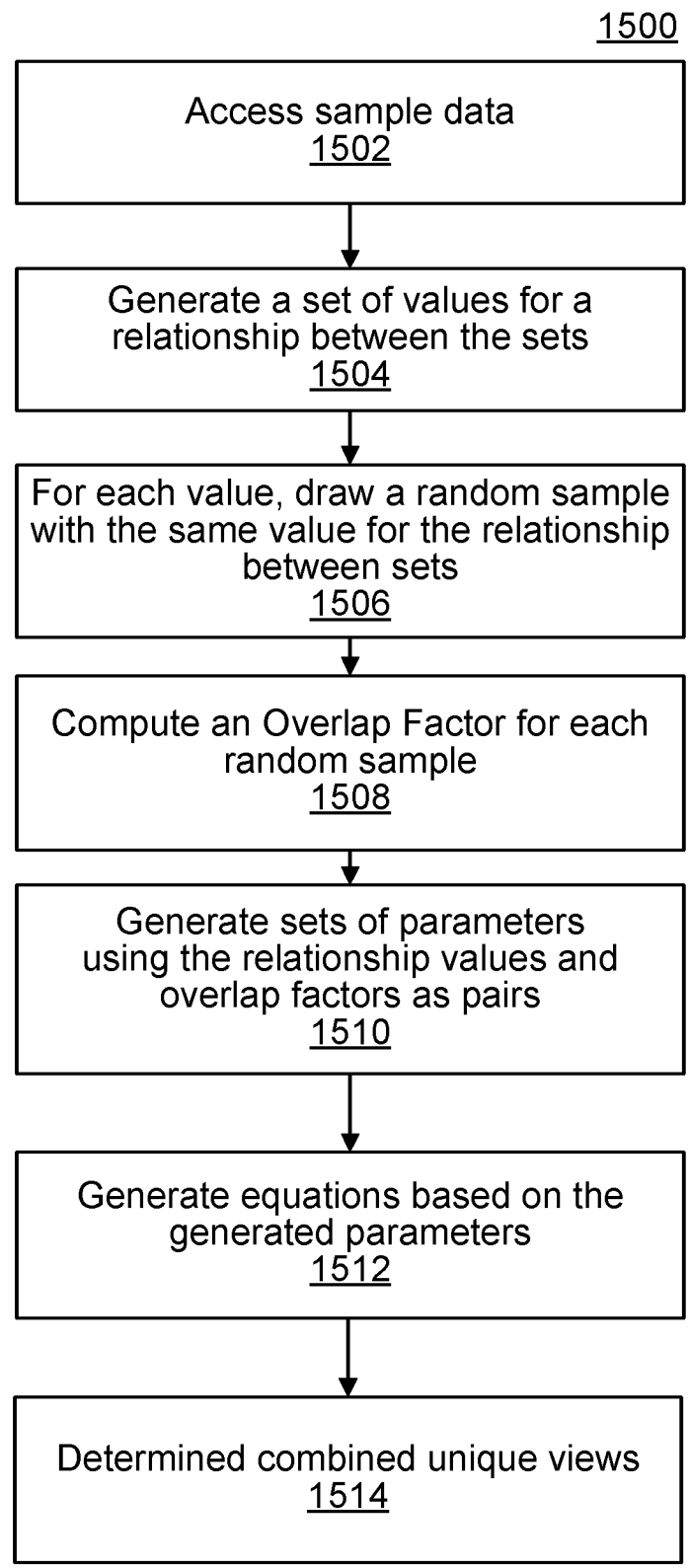
FIG. 15 is a flow chart illustrating an example of a process for generating overlap factors for combining multiple sets.

For instance, the overlap factor can be calculated as described with respect to FIGS. 14 and 15.

The mobile device module 304b determines the total mobile unique views for the entity (1106). For instance, the following formula may be used to apply the overlap:

Mobile $UV$=Mobile Web $UV$+(1−Overlap Factor)*Mobile App $UV$

The above techniques are used on usage data which is understood to represent mobile devices, such as smart phones and tablet computers. Once a count for unique visitors is determined for mobile devices, this count may be used along with other usage data in order to arrive at a total count of unique visitors over all devices as further described below.

Establishing Unique Visitors on Shared Use Computers

In addition to personal computing devices and mobile devices, internet use also occurs on computers made available to members of the public to use on a short-term basis. Libraries, community centers, and internet cafes among other locations provide internet use that, in some countries, represents a significant fraction of the internet audience.

In measuring unique visitors for shared devices, a basic assumption that equates the number of devices with the number of users may be inapplicable here. A particular shared device may have several unique users each day and a user is likely to use multiple shared use devices during a reporting period.

Figure 12:
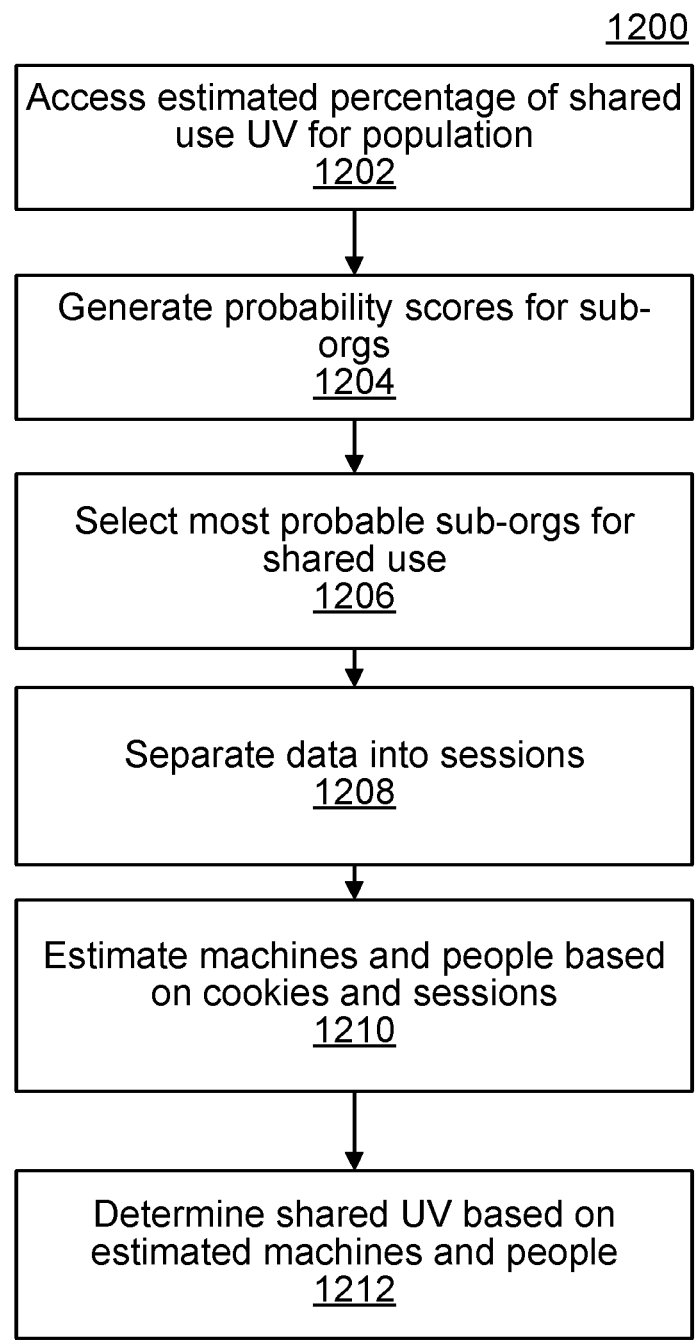
FIG. 12 is a flow chart illustrating an example of a process for identifying and measuring shared device usage data.

FIG. 12 is a flowchart illustrating an example of a process 1200 for identifying and measuring shared use device activity. The following describes process 1200 as being performed by the shared use module 304c. However, the process 1200 may be performed by other systems or system configurations.

The shared use module 304c accesses an estimated percentage of unique visitors that should come from shared use devices within the population being measured (1202). This information may come from an external source, such as a survey or other separate means of measuring audience data. The data may be based on the relevant population for which the shared device usage data is to be measured; for example, the relevant population may be usage data associated with a given country. In other words, the estimated percentage may represent the estimated fraction of the total unique views for a given population, such as a country or region, that is expected to come from shared use devices. The estimated percentage may be estimated by survey data, from the use of a consideration set, or may be set dynamically based on other data interactions within the system.

The shared use module 304c divides the usage data according to IP address. Each IP address block of the two or three most significant octets in the IP address, referred to as a "sub-org", is analyzed to see if the usage data has characteristics of shared use.

Each sub-org is assigned a probability to determine whether it contains activity from shared devices (1204). The name of organizations possessing IP addresses in a block (such as "café", "university", or "library") may indicate shared use activity and may be used to establish a baseline for typical shared use behavior at the level of the address block. The level of activity during different times of day may indicate shared use activity; for example, a higher usage outside of office hours and on weekends may be indicative of shared devices. Also, cookies that refresh very frequently and are assigned more frequently may indicate a higher probability of shared use activity.

The sub-orgs are sorted based on a scored probability of being shared use, and the most probable are selected as shared use (1206). In some implementations, such as identifying a percentage of users who are shared-use only users, the accessed estimated percentage of unique visitors that should come from shared use devices is used in order to determine how many sub-orgs to identify and analyze as shared use. The most probable sub-org may be classified as shared use until the percentage of usage data represented by the classified sub-orgs matches the enumerated percentage for shared use. Alternatively, in some implementations, probabilities are compared against a threshold value, and all those sub-org probabilities above the threshold value are identified as the shared device usage data.

The shared device usage data corresponding to the sub-orgs classified as shared use is separated into sessions (1208). Sessions represent a window of time during which it is reasonable to estimate a single person may have used each machine in a shared use establishment. For example, each window may represent one hour of time, and so usage data is segmented according to the hour of the day in which it occurred.

The system uses the unique identifier present in the cookie data, separated into sessions, in order to estimate the total number of machines available for a particular location (for example, library or café), and a number of people that used those machines over a given period (1210). The number of machines is estimated by counting the number of cookies during any single session; the highest number of cookies recorded during a single session in a measurement period is considered to be the number of machines available for a particular shared use suborg. The number of people is estimated by counting, for each session during a given period, the total number of cookies recorded during each session, and summing those cookies over the whole period. In some implementations, the period may be a day, and the sessions may each represent one hour of the day.

The estimated numbers of machines and persons can be used in conjunction with a projected reach-frequency equation in order to determine a number of unique visitors (1212). For instance, this may be accomplished by comparing intensity on the first day of the month to intensity over the whole month, using for example the following equation:

$$UV=\text{Hits}/(1+E_p{}^*P\hat{\,}(\ln(E_p+1)/(S_p+1))/\ln(30))$$

The variable P in the above equation is a factor identifying the relationship of overall machine consumption to the consumption for a single person, as further described by the following equation:

$$P=(1+S_m{}^*15\hat{\,}(\ln((E_m-1)/(S_m-1))/\ln(30)))/(1+S_p{}^*15\hat{\,}(\ln((E_p-1)/(S_p-1))/\ln(30)))$$

Wherein $E_p$ represents the hits per person averaged over the entire month, $S_p$ represents the hits per person measured on the first day of the month, $E_m$ represents the hits per machine measured across the entire month, and $S_m$ the hits per machine estimated on the first day of the month.

For each identified location, which as described may be inferred based on the use of an IP address block with similar usage patterns, the above estimate and equation can be used to generate a shared device UV. When aggregated with the unique visitors measured at other locations, the result can be used to represent shared device unique visitors over the whole population.

The above techniques are used on usage data which is understood to represent shared use devices. Once a count for unique visitors is determined for shared devices, this count is used along with other usage data in order to arrive at a total count of unique visitors over all devices as further described below.

Combining Categories

Figure 13:
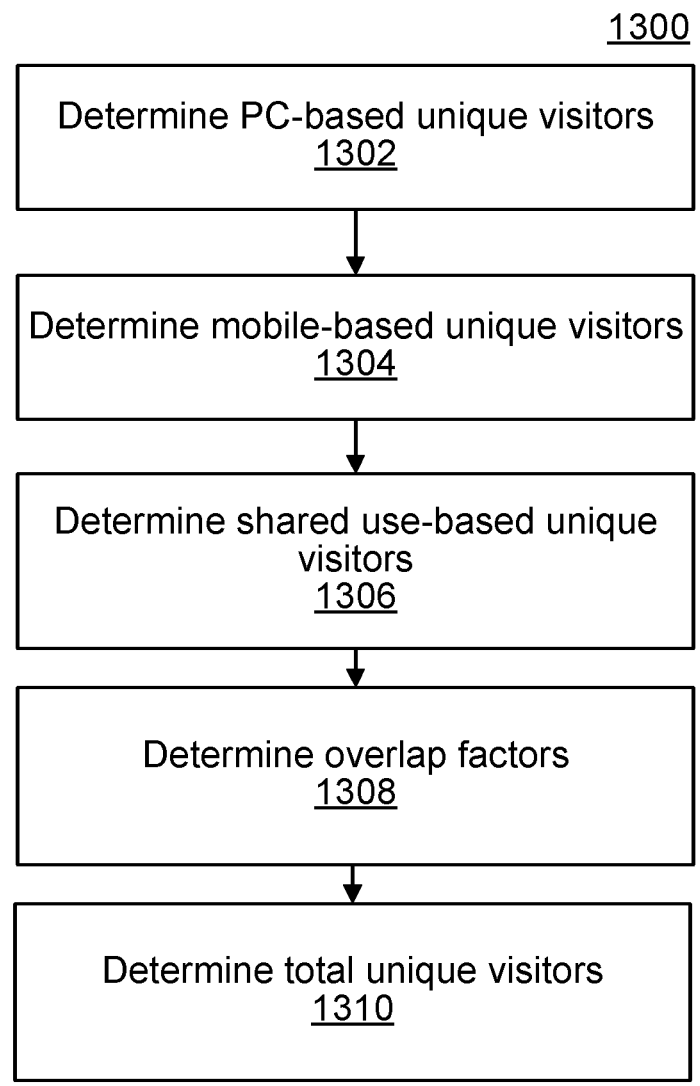
FIG. 13 is a flow chart illustrating an example of a process to combine unique visitors measured for different classified devices to produce a total count of unique visitors.

FIG. 13 is a flow-chart illustrating an example of a process 1300 for determining the total unique visitors to a given entity. Generally, process 1300 involves combining the unique visitors to the entity measured for different classified devices to produce a total count of unique visitors. The following describes process 1300 as being performed by the overlap processor 306. However, the process 1300 may be performed by other systems or system configurations.

The overlap processor 306 determines a count of the unique visitors to the entity using personal computing devices (1302). The primary source of data, as described above, may be based on client devices responding to beacon instructions. The count may proceed according to the details explained above, and may generally be corrected or calibrated by the use of panel data as described herein.

The overlap processor 306 determines a count of unique visitors to the entity using mobile devices (1304). This data may be determined using the techniques described above. For instance, this data may be based on unique identifiers representing both cookies and IP addresses, both short-lived and persistent. Persistent cookies may be used to evaluate the rest of the data as described herein. Mobile app data may be removed in pre-processing and re-aggregated with mobile web data near the end of the process.

The overlap processor 306 determines a count of unique visitors to the entity using shared use devices (1306). This data may be determined using the techniques described above. For instance, this data may be based on usage segmented into sessions in order to estimate usage patterns for each location. A variety of factors may be used to identify which usage data should be attributed to shared use devices and evaluated by this method.

Having determined personal device UV, mobile device UV, and shared device UV, the overlap processor 306 then works to identify overlap factors between these three categories of use (1308). The total unique visitors to report for the whole population can then be determined by aggregating the different device UVs adjusted according to the overlap factors (1310).

Different processes are available for calculating overlap and aggregating unique visitors for different groups. FIG. 14 illustrates an example of a process 1400 for combining the personal device and mobile device UV counts into a single UV count reflecting both.

The system defines and identifies home ISPs with static IP addresses in order to generate a consideration set (1402). They are identified by finding persistent cookies within the personal device data that have activity within both the first five days and last five days of the month. Given this level of persistence, cookies are considered to be equivalent to machines.

The corresponding ISP name and hashed IP addresses corresponding to those cookies are identified. If any given IP address has more than 10 of these cookies, then all the cookies corresponding to that IP address are defined as coming from an enterprise rather than a household and not included the consideration set of static home ISPs. An ISP having at least 80% of the cookies with a single IP address and with less than 20% of the cookies coming from an enterprise is defined as a static home ISP.

The identified data is run as a consideration set for static ISPs (1404). All traffic observed for the month is included. The traffic is grouped by entity, platform and device, and IP address.

The system determines the number of distinct IP addresses having traffic classified as mobile web, traffic classified as mobile app, and traffic classified as personal device (that is, non-mobile traffic). The system also determines the number of distinct IP addresses having traffic qualifying under two or all three of these classifications. These data for the consideration set are used to generate the overlap factors.

First, the overlap factor between mobile web and mobile app is generated (1406). This may be, for example, the ratio of the IP addresses having traffic both for mobile web and mobile apps to all of the IP address having mobile app traffic.

The overlap factor is then used to determine the total mobile device unique visitors (1408). For example, where Overlap Factor=Mobile *Web* and *App* Count/Mobile *App* Count as described above, the combined mobile UV may be Mobile UV=Mobile Web UV+(1−Overlap Factor)*Mobile App UV In this way, the consideration set data may be used to estimate an overlap factor which is then used to combine the determined UVs to get a total UV count.

The overlap factor between mobile devices and personal devices may be generated in a similar fashion (1410). Here again, the overlap factor may be the ratio of IP addresses having both personal and mobile device traffic divided by the total number of IP addresses having mobile device traffic.

The PC-mobile overlap factor is then used to determine the total unique visitors for both personal and mobile devices (1412). For example, where Overlap Factor=Personal and Mobile Device Count/ Mobile Device Count as described above, the combined UV may be Total UV for mobile and PC=Personal Device UV+ (1−Overlap Factor)*Mobile UV FIG. 15 illustrates an example of a process 1500 for generating overlap factors based on a set of sample data and using those factors to determine combined unique views. Generally, the process 1500 yields a function $\phi$ that takes as an input a relationship between the two sets, and returns an overlap factor for those two sets. The overlap factor is based on the actual overlap for the sample when the relationship is true for the sample data.

For purposes of illustration, the following examples will use the overlap of unique visitors for three sets P, M, and S, which represent personal computing device usage data, mobile device usage data, and shared use device usage data respectively for a given web entity w. As described, the process 1500 is used on two sets at a time to calculate an overlap and combine the UVs of those two sets. Therefore, to combine all three sets P, M, and S, the steps of the process can be carried out twice. The process 1500 will be illustrated by first combining personal computing device usage data P with mobile device usage data M. The process 1500 will then be used a second time in the combination of P with M will be combined with S, in order to arrive at a total UV count for the web entity w.

The overlap processor 306 accesses sample data (1502). The sample data may represent a survey, may be a consideration set of historical data, or may be another set of sample data for which population and overlap information is available. In some implementations, the sample data may represent panel data provided by client systems. The sample should generally include data that is characteristic of each of the two sets for which overlap is being calculated.

For example, for combining UVs for a web entity w, a survey may be given to a subset of visitors currently accessing the web entity w. The survey may be given, for example, in response to beacon data being sent from the client devices as the user accesses the web entity w. The resulting survey data may be used as the sample data. The survey data may include answers to two questions—the type of device the user is currently using to access the web entity w, and which other types of the devices the user regularly uses for accessing the internet. In one embodiment, this data may be represented by $P_W$, $M_W$, and $S_W$ representing the set of users currently using a personal computing device, mobile device, and shared device respectively to access the web entity w based on responses to the first question; this data forms a sample set of users accessing entity w. $P_I$, $M_I$, and $S_I$ may represent the set of users that use each of those devices regularly based on responses to the second question. This data may be used to help calculate the overlap between $P_W$, $M_W$, and $S_W$, as the survey itself may not directly establish the overlap between these sets. Because the same users are given both questions, the overlap sets $P_W \cap M_I$, $M_W \cap P_I$, $P_W \cap S_I$, $S_W \cap P_I$, $M_W \cap S_I$, and $S_W \cap P_I$ are also available from the survey data. For example, the size of the intersection of $P_W$ and $M_W$ may be estimated as follows:

$|P_W \cap M_W|$=MIN($|P_W \cap M_I|$, $|M_W \cap P_I|$) That is, the number of users within the survey sample that access the entity w both on a personal computing device and on a mobile device can be estimated to be the lesser of the two of the number of users within the survey sample who reported currently accessing the entity w from a personal computing device and also regularly using a mobile device ($|P_W \cap M_I|$), and the number of users within the survey sample who reported currently accessing the entity w from a mobile device and also regularly using a personal computing device ($|P_I \cap M_W|$).

The overlap processor 306 generates a set of values for a relationship between the sets of sample data (1504). The relationship is one that influences the overlap factor between the two sets. For example, in one implementation, the ratio of the reach of the two sets influences their overlap factor. In some implementations, these values may be distributed over the entire domain of possible or expected values for the relationship itself.

For example, the ratio of the reach of two sets may typically be a value between 0.01 and 1. The relationship values of 0.01, 0.02, 0.05, 0.1, 0.2, 0.3 . . . may be included in the set of relationship values.

For each value in the set, the system draws a random sample from the sample data that satisfies the relationship value (1506). For example, for each of the above relationship values, a set $P'_W$ is randomly sampled from $P_W$. The randomly sampled set is chosen of a size such that $|M_W|/|P'_W|$ is equal to the relationship value, such as 0.05 or 0.3.

For each random sample, the system computes on overlap factor (1508). As above, the overlap factor for $M_W$ and $P'_W$ may be expressed as Overlap Factor $M_W$ and $P'_W$=(MIN ($|P_I \cap M_W|$,$|P_W \cap M_I|$))/($|P'_W|$+$|M_W|$)

This value may vary for each different $P'_W$ for each different relationship value.

The overlap factors in conjunction with their relationship values are then organized as parameters in a data set, with each (relationship value, overlap factor) pair acting as a single data point (1510). In some implementations, transformations may be performed on some or all parameters in order to normalize them, and outlying points may be detected and discarded.

Using the parameters that pair each relationship value with its resultant overlap factor, the overlap processor 306 generates an equation $\phi$ based on the generated parameters (1512). In some implementations, the equation $\phi$ may represent a linear or parabolic extrapolation of the parameters. In some implementations, the equation $\phi$ may include value and slope constraints that may modify the equation from a straight extrapolation. The equation $\phi$ accepts a relationship value that expresses a relation (for example, ratio of reach) between two sets, and returns an overlap factor for unique visitors for those sets.

The overlap processor 306 then uses the equations to determine the combined unique views (1514). For example, the overlap processor 306 may generate the equation $\phi_{P,M}$, which can be used to return an overlap factor for the unique views in P and M by means of their reach ratio:

$$UV\ \text{Overlap}_{P,M} = (|P|/|M|)$$

The UV overlap factor is then used to calculate unique views for personal and mobile devices for the web entity w:

Combined personal and mobile $UV$=(personal $UV$+mobile $UV$)*(1−$UV$ Overlap$_{P,M}$)

Having determined the total unique views for the web entity w for personal and mobile devices, the same process can be used again, this time combining the survey data for personal and mobile devices, $PM_W$, and pairing it with the survey data for shared use devices, $S_W$.

As above, the overlap processor 306 may generate an equation $\phi_{PM,S}$ based on generating random samples of the survey data having certain relationship values and extrapolating the resulting overlap factors for the random samples. Once generated, the equation $\phi_{PM,S}$ may be used to generate a total UV across all three classifications of device, first by calculating the overlap between the combined personal and mobile data and the shared data:

$$UV\ \text{Overlap}_{PM,S} = \phi_{PM,S}(|S|/|PM|)$$

Where |PM| is the combined reach of the personal and mobile usage data. Once the overlap is known, the total UV can be calculated for the web entity w.

Total $UV$=(combined personal and mobile $UV$+shared $UV$)*(1−$UV$ Overlap$_{PM,S}$)

By the use of reliable sample data that includes overlap data, it is possible to extrapolate an overlap factor for unique visitor counts for different devices.

Systems for Implementation

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

The invention claimed is:

1. A computer-implemented method, comprising:
   accessing mobile usage data representing the access of one or more resources on a network by mobile devices, the mobile usage data including information received from mobile devices as a result of beacon instructions included with the one or more resources;
   determining, based on the accessed mobile usage data, a first set of data representing information about accesses to the one or more resources by mobile devices with persistent beacon, identifiers, wherein the persistent beacon identifiers meet a persistence threshold;
   determining, based on the accessed mobile usage data, a second set of data representing information about accesses to the one or more resources by mobile devices with non-persistent beacon, identifiers, wherein the non-persistent beacon identifiers does not meet the persistence threshold;
   determining one or more adjustment factors based on the first set of data; and
   determining a count of unique visitors accessing the one or more resources from the mobile devices based, at least in part, on a count of accesses by the mobile devices with persistent beacon identifiers and a count of accesses by the mobile devices with non-persistent beacon identifiers adjusted by the one or more adjustment factors.

2. The method of claim 1, further comprising:
   pre-processing the mobile usage data by at least one of standardizing the mobile usage data, consolidating the mobile usage data, or eliminating or reclassifying at least some of the mobile usage data.

3. The method of claim 1, wherein the first set of data comprises the persistent beacon identifiers or unique IP addresses and times at which the one or more resources are accessed.

4. The method of claim 1, wherein the persistent beacon identifiers are present for greater than a persistence duration threshold or have activity that exceeds a persistence activity threshold.

5. The method of claim 4, wherein the persistence duration threshold is adjusted based on estimated data.

6. The method of claim 1, wherein determining the count of unique visitors accessing the one or more resources from the mobile devices comprises summing the count of accesses by the mobile devices with persistent beacon identifiers and the count of accesses by the mobile devices with non-persistent beacon identifiers adjusted by the one or more adjustment factors.

7. A non-transitory computer-readable medium storing instructions that, when executed by a processor, effectuate operations comprising:
    accessing mobile usage data representing the access of one or more resources on a network by mobile devices, the mobile usage data including information received from mobile devices as a result of beacon instructions included with the one or more resources;
    determining, based on the accessed mobile usage data, a first set of data representing information about accesses to the one or more resources by mobile devices with persistent beacon, identifiers, wherein the persistent beacon identifiers meet a persistence threshold;
    determining, based on the accessed mobile usage data, a second set of data representing information about accesses to the one or more resources by mobile devices with non-persistent beacon, identifiers, wherein the non-persistent beacon identifiers does not meet the persistence threshold;
    determining one or more adjustment factors based on the first set of data; and
    determining a count of unique visitors accessing the one or more resources from the mobile devices based, at least in part, on a count of accesses by the mobile devices with persistent beacon identifiers and a count of accesses by the mobile devices with non-persistent beacon identifiers adjusted by the one or more adjustment factors.

8. The non-transitory computer-readable medium of claim 7, wherein the operations further comprise:
    pre-processing the mobile usage data by at least one of standardizing the mobile usage data, consolidating the mobile usage data, or eliminating or reclassifying at least some of the mobile usage data.

9. The non-transitory computer-readable medium of claim 7, wherein the first set of data comprises the persistent beacon identifiers or unique IP addresses and times at which the one or more resources are accessed.

10. The non-transitory computer-readable medium of claim 7, wherein the persistent beacon identifiers are present for greater than a persistence duration threshold or have activity that exceeds a persistence activity threshold.

11. The non-transitory computer-readable medium of claim 10, wherein the persistence duration threshold is adjusted based on estimated data.

12. The non-transitory computer-readable medium of claim 7, wherein determining the count of unique visitors accessing the one or more resources from the mobile devices comprises summing the count of accesses by the mobile devices with persistent beacon identifiers and the count of accesses by the mobile devices with non-persistent beacon identifiers adjusted by the one or more adjustment factors.

13. A system, comprising:
    at least one processor; and
    at least one storage device in communication with the at least one processor, wherein the at least one storage device stores instructions that, when executed by the at least one processor, effectuate operations comprising:
    accessing mobile usage data representing the access of one or more resources on a network by mobile devices, the mobile usage data including information received from mobile devices as a result of beacon instructions included with the one or more resources;
    determining, based on the accessed mobile usage data, a first set of data representing information about accesses to the one or more resources by mobile devices with persistent beacon, identifiers, wherein the persistent beacon identifiers meet a persistence threshold;
    determining, based on the accessed mobile usage data, a second set of data representing information about accesses to the one or more resources by mobile devices with non-persistent beacon, identifiers, wherein the non-persistent beacon identifiers does not meet the persistence threshold;
    determining one or more adjustment factors based on the first set of data; and
    determining a count of unique visitors accessing the one or more resources from the mobile devices based, at least in part, on a count of accesses by the mobile devices with persistent beacon identifiers and a count of accesses by the mobile devices with non-persistent beacon identifiers adjusted by the one or more adjustment factors.

14. The system of claim 13, wherein the operations further comprise:
    pre-processing the mobile usage data by at least one of standardizing the mobile usage data, consolidating the mobile usage data, or eliminating or reclassifying at least some of the mobile usage data.

15. The system of claim 13, wherein the first set of data comprises the persistent beacon identifiers or unique IP addresses and times at which the one or more resources are accessed.

16. The system of claim 13, wherein the persistent beacon identifiers are present for greater than a persistence duration threshold or have activity that exceeds a persistence activity threshold.

17. The system of claim 16, wherein the persistence duration threshold is adjusted based on estimated data.

18. The system of claim 13, wherein determining the count of unique visitors accessing the one or more resources from the mobile devices comprises summing the count of accesses by the mobile devices with persistent beacon identifiers and the count of accesses by the mobile devices with non-persistent beacon identifiers adjusted by the one or more adjustment factors.

19. The method of claim 1, wherein the persistent beacon identifiers are persistent beacon cookies and the non-persistent beacon identifiers are non-persistent beacon cookies.

20. The system of claim 13, wherein the persistent beacon identifiers are persistent beacon cookies and the non-persistent beacon identifiers are non-persistent beacon cookies.

* * * * *